United States Patent
Smiddy et al.

(10) Patent No.: US 12,351,482 B2
(45) Date of Patent: *Jul. 8, 2025

(54) METHOD FOR THE TREATMENT OF WASTEWATER

(71) Applicant: Evoqua Water Technologies LLC, Pittsburgh, PA (US)

(72) Inventors: Gerard Willem Smiddy, Grand Rapids, MI (US); Frank Leslie Smiddy, Thompsonville, MI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 811 days.

This patent is subject to a terminal disclaimer.

(21) Appl. No.: 17/528,515

(22) Filed: Nov. 17, 2021

(65) Prior Publication Data

US 2022/0073375 A1 Mar. 10, 2022

Related U.S. Application Data

(60) Continuation of application No. 16/299,691, filed on Mar. 12, 2019, now Pat. No. 11,198,625, which is a
(Continued)

(51) Int. Cl.
*C02F 1/28* (2023.01)
*C02F 1/00* (2023.01)
(Continued)

(52) U.S. Cl.
CPC .............. *C02F 1/281* (2013.01); *C02F 1/004* (2013.01); *C02F 1/38* (2013.01); *C02F 1/52* (2013.01);
(Continued)

(58) Field of Classification Search
CPC ...... C02F 9/00; C02F 1/28; C02F 1/38; C02F 1/52
See application file for complete search history.

(56) References Cited

U.S. PATENT DOCUMENTS 3,276,698 A 10/1966 Wood
3,846,304 A * 11/1974 Garbo ................ B01D 24/4631
210/794
(Continued)

FOREIGN PATENT DOCUMENTS

KR 641752 B1 * 11/2006

OTHER PUBLICATIONS

KR 641752 B1 translation (Year: 2006).*

*Primary Examiner* — Chester T Barry

(57) ABSTRACT

A system and method for backwashing a sand filter in a wastewater treatment system. In one aspect, the invention can be a system for backwashing a sand filter comprising: a sand filter configured to remove solids from an untreated wastewater; a container storing chlorine fluidly coupled to the sand filter by a chlorine supply manifold; a flow control mechanism positioned on the chlorine supply manifold between the container and the sand filter, the flow control mechanism alterable between a first position whereby chlorine cannot flow from the container to the sand filter and a second position whereby chlorine flows from the container to the sand filter, the flow control mechanism being biased into the first position; and a processor operably coupled to the flow control mechanism and configured to automatically actuate the flow control mechanism into the second position upon detecting that the sand filter is being backwashed.

9 Claims, 12 Drawing Sheets

Related U.S. Application Data division of application No. 16/231,861, filed on Dec. 24, 2018, now Pat. No. 11,192,803, which is a continuation of application No. 14/983,831, filed on Dec. 30, 2015, now Pat. No. 10,160,664, which is a division of application No. 13/947,883, filed on Jul. 22, 2013, now Pat. No. 9,255,025.

(60) Provisional application No. 61/674,040, filed on Jul. 20, 2012.

(51) Int. Cl.
    C02F 1/38    (2023.01)
    C02F 1/52    (2023.01)
    C02F 9/00    (2023.01)
    C02F 9/20    (2023.01)
    C02F 1/74    (2023.01)
    C02F 101/20    (2006.01)
    C02F 101/32    (2006.01)
    C02F 103/10    (2006.01)

(52) U.S. Cl.
CPC ............... *C02F 9/00* (2013.01); *C02F 9/20* (2023.01); *C02F 2001/007* (2013.01); *C02F 1/283* (2013.01); *C02F 1/288* (2013.01); *C02F 1/74* (2013.01); *C02F 2101/203* (2013.01); *C02F 2101/32* (2013.01); *C02F 2103/10* (2013.01); *C02F 2201/008* (2013.01); *C02F 2209/00* (2013.01); *C02F 2209/40* (2013.01); *C02F 2303/16* (2013.01)

(56) References Cited

U.S. PATENT DOCUMENTS

| | | | |
|---|---|---|---|
| 3,932,278 A * | 1/1976 | Meidl | C02F 1/001 |
| | | | 134/25.5 |
| 4,145,279 A | 3/1979 | Selby, III | |
| 1,243,522 A | 1/1981 | Ter-Borch et al. | |
| 4,367,145 A | 1/1983 | Simpson et al. | |
| 4,536,286 A | 8/1985 | Nugent | |
| 4,800,021 A | 1/1989 | Desbos | |
| 4,855,061 A | 8/1989 | Martin | |
| 4,927,543 A | 5/1990 | Bablon et al. | |
| 4,999,103 A | 3/1991 | Bogart | |
| 5,019,268 A | 5/1991 | Rogalla | |
| 5,082,560 A * | 1/1992 | Eli | C02F 1/5281 |
| | | | 210/512.1 |
| 5,137,636 A | 8/1992 | Bundgaard | |
| 5,160,043 A | 11/1992 | Kos | |
| 5,192,441 A | 3/1993 | Sibony et al. | |
| 5,213,681 A | 5/1993 | Kos | |
| 5,314,621 A | 5/1994 | Rogalla | |
| 5,364,537 A | 11/1994 | Paillard | |
| 5,421,995 A | 6/1995 | Norcross | |
| 5,460,723 A | 10/1995 | Bourbigot et al. | |
| 5,520,803 A | 5/1996 | Russell et al. | |
| 5,536,407 A | 7/1996 | Petersen | |
| 5,544,598 A | 8/1996 | Guibelin et al. | |
| 5,547,578 A | 8/1996 | Nielsen | |
| 5,589,068 A | 12/1996 | Nielsen | |
| 5,607,593 A | 3/1997 | Cote et al. | |
| 5,635,073 A | 6/1997 | Aktor et al. | |
| 5,650,069 A | 7/1997 | Hong et al. | |
| 5,667,688 A | 9/1997 | Kerm-Jespersen et al. | |
| 5,725,757 A | 3/1998 | Binot | |
| 5,795,481 A | 8/1998 | Lesouef | |
| 5,800,701 A | 9/1998 | Larsen | |
| 5,858,768 A | 1/1999 | Bonnin et al. | |
| 5,908,554 A | 6/1999 | Tholander et al. | |
| 5,932,099 A | 8/1999 | Cote et al. | |
| 5,948,275 A | 9/1999 | Djafer et al. | |
| 5,954,964 A | 9/1999 | Nielsen et al. | |
| 6,010,631 A | 1/2000 | Delsalle et al. | |
| 6,068,047 A | 5/2000 | Buchhave | |
| 6,117,203 A | 9/2000 | Buchhave et al. | |
| 6,129,104 A | 10/2000 | Ellard et al. | |
| 6,197,190 B1 | 3/2001 | Hanlon | |
| 6,238,562 B1 | 5/2001 | Nielsen et al. | |
| 6,290,849 B1 | 9/2001 | Rykaer et al. | |
| 6,325,933 B1 | 12/2001 | Nielsen et al. | |
| 6,325,935 B1 | 12/2001 | Hojsgaard | |
| 6,632,365 B1 | 10/2003 | Payraudeau et al. | |
| 6,645,385 B2 | 11/2003 | Krulik et al. | |
| 6,645,386 B1 | 11/2003 | Moreau et al. | |
| 6,685,834 B1 | 2/2004 | Murthy et al. | |
| 6,824,692 B2 | 11/2004 | Binot et al. | |
| 6,919,031 B2 | 7/2005 | Blumenschein et al. | |
| 6,966,989 B2 | 11/2005 | Hojsgaard et al. | |
| 6,966,993 B2 | 11/2005 | Binot | |
| 7,001,525 B2 | 2/2006 | Binot et al. | |
| 7,083,715 B2 | 8/2006 | Binot | |
| 9,225,025 B2 * | 12/2015 | Li | H01M 8/241 |
| 2013/0048562 A1 | 2/2013 | Keister | |

* cited by examiner

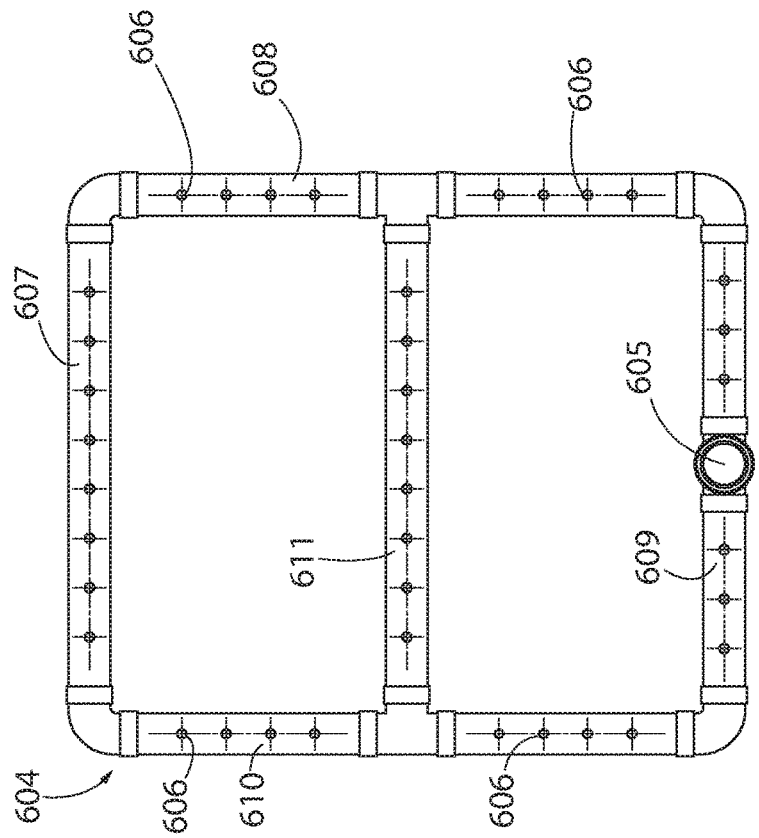
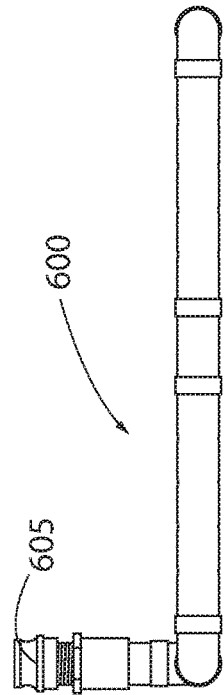
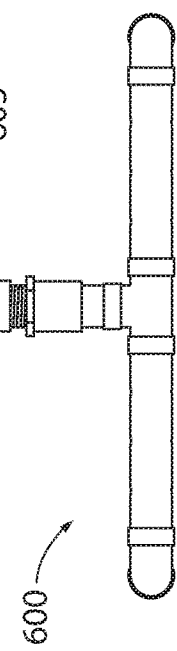
FIG. 4A
FIG. 4B
FIG. 4C

METHOD FOR THE TREATMENT OF WASTEWATER

CROSS-REFERENCE TO RELATED APPLICATIONS

This application is a divisional of U.S. patent application Ser. No. 13/947,883, filed Jul. 22, 2013, which claims priority to U.S. Provisional Patent Application Ser. No. 61/674,040, filed on Jul. 20, 2012, the entireties of which are incorporated herein by reference.

FIELD OF THE INVENTION

The present invention relates generally to a system and method for the treatment of wastewater, and specifically to a system and method for removing contaminants from wastewater.

BACKGROUND OF THE INVENTION

Construction sites, major industrial properties, riverbeds, caissons, mine shafts and the like have a tendency to collect wastewater. This wastewater must be removed to enable construction to take place on the construction site or cleaned to remove toxins and the like from riverbeds. The wastewater that collects in these locations contains contaminants such as iron, nickel, zinc, chromium, arsenic, lead and many others. Water that is removed from a wastewater site must comply with specific discharge limitations prior to being discharged to surface water, such as a fresh water stream or river. Thus, the contaminants must be removed from the wastewater prior to discharge.

Previous systems and methods for removing contaminants from wastewater are too costly, too difficult to manufacture, non-movable and do not operate at desired or variable speeds. Thus, a need exists for a system and method for the treatment of wastewater that increases the speed at which the wastewater can be treated and more effectively removes the contaminants from the wastewater.

SUMMARY OF THE INVENTION

These and other needs are met by the present invention, which is directed to a system and method for the treatment of wastewater. In one aspect, the invention can be a method for treating wastewater comprising: a) introducing untreated wastewater into a holding tank; b) flowing the untreated wastewater into a first wastewater treatment trailer to provide a first treatment regimen to the untreated wastewater to form a first treated wastewater; c) flowing the first treated wastewater into a second wastewater treatment trailer to provide a second treatment regimen to the first treated wastewater to form a second treated wastewater; and wherein the holding tank, the first wastewater treatment trailer and the second wastewater treatment trailer are fluidly coupled together to facilitate flow of the untreated wastewater into and through each of the holding tank and the first wastewater treatment trailer and flow of the first treated wastewater into and through the second wastewater treatment trailer.

In another aspect, the invention can be a system for treating wastewater comprising: a holding tank configured to store untreated wastewater; a first trailer configured to provide a first treatment regimen to the untreated wastewater to form a first treated wastewater; a second trailer configured to provide a second treatment regimen to the first treated wastewater to form a second treated wastewater; and wherein the holding tank, the first trailer and the second trailer are fluidly coupled together to facilitate flow of the untreated wastewater into and through each of the holding tank and the first trailer and flow of the first treated wastewater into and through the second trailer.

In yet another aspect, the invention can be a method of backwashing a sand filter in a wastewater treatment system, the method comprising: a) flowing wastewater through at least one sand filter in a first flow direction; b) backwashing the at least one sand filter to form backwashed water; and c) upon initiation of step b), automatically injecting chlorine into the at least one sand filter.

In a further aspect, the invention can be a system for backwashing a sand filter comprising: at least one sand filter configured to remove solids from an untreated wastewater; a container storing chlorine therein, the container being fluidly coupled to the at least one sand filter by a chlorine supply manifold; a flow control mechanism positioned on the chlorine supply manifold between the container and the at least one sand filter, the flow control mechanism alterable between a first position whereby chlorine cannot flow from the container to the at least one sand filter and a second position whereby chlorine flows from the container to the at least one sand filter, the flow control mechanism being biased into the first position; and a processor operably coupled to the flow control mechanism and configured to automatically actuate the flow control mechanism into the second position to flow the chlorine from the container into the at least one sand filter upon detecting that the at least one sand filter is being backwashed.

In a still further aspect, the invention can be a method of treating wastewater comprising: a) flowing wastewater into at least one sand filter; b) backwashing the sand filter to form backwashed water; and c) flowing the backwashed water from the sand filter to at least one hydrocyclone to separate the backwashed water into solid material and liquid.

In still another aspect, the invention can be a system for treating wastewater comprising: at least one sand filter configured to remove solids from an untreated wastewater; at least one hydrocyclone having an inlet port fluidly coupled to the at least one sand filter by a backwash conduit, the backwash conduit carrying backwash wastewater from the at least one sand filter to the at least one hydrocyclone when the at least one sand filter is being backwashed, the at least one hydrocyclone configured to separate the backwash wastewater into solid material and a liquid; the at least one hydrocyclone having a first outlet port fluidly coupled to a settling tank and a second outlet port fluidly coupled to a slop tank; and wherein the liquid flows from the at least one hydrocyclone through the first outlet port and into the settling tank and wherein the solid material flows from the at least one hydrocyclone through the second outlet port and into the slop tank.

In an even further aspect, the invention can be a frac tank system comprising: a frac tank having an inner cavity, a body of fluid having a surface level contained within the inner cavity of the frac tank; a first weir dividing the inner cavity into an aeration chamber and a discharge chamber, the aeration chamber being in fluid communication with the discharge chamber; and an aerator system fluidly coupled to the aeration chamber and configured to introduce a gas into a bottom portion of the aeration chamber to aerate a portion of the body of fluid that is contained within the aeration chamber and prevent solid particles from accumulating on a floor of the aeration chamber.

The invention may, in yet another aspect, be a frac tank system comprising: a frac tank having an inner cavity, a body of fluid having a surface level contained within the inner cavity of the frac tank; an aerator system comprising a blower that is permanently mounted to the frac tank and one or more conduits coupled to the blower; and wherein the aerator system is configured to introduce a gas into a bottom portion of the inner cavity to aerate the body of fluid and prevent solid particles from accumulating on a floor of the aeration chamber.

In another aspect, the invention can be a frac tank system comprising: a frac tank having an inner cavity, a body of fluid having a surface level contained within the inner cavity of the frac tank; a weir dividing the inner cavity into an aeration chamber and a discharge chamber; at least one inlet port formed into a first sidewall of the frac tank for introducing the fluid into the aeration chamber; a first outlet port formed into a second sidewall of the frac tank for drawing the fluid from a bottom portion of the discharge chamber; and a second outlet port formed into the second sidewall of the frac tank for drawing the fluid from a top portion of the discharge chamber.

In yet another aspect, the invention can be a wastewater treatment system comprising: a first trailer comprising: a sand filter system; one or more hydrocyclones fluidly coupled to the sand filter system; a settling tank fluidly coupled to the one or more hydrocyclones; and a slop tank fluidly coupled to the one or more hydrocyclones.

In a further aspect, the invention can be a wastewater treatment system comprising: a first trailer comprising: a sand filter system; a clay filter system fluidly coupled to the sand filter system; one or more hydrocyclones fluidly coupled to the sand filter system; and a settling tank fluidly coupled to the one or more hydrocyclones; a second trailer comprising: a carbon filter system fluidly coupled to the clay filter system of the first trailer; and a bag filter system fluidly coupled to the carbon filter system; and a frac tank fluidly coupled to the sand filter system and to the settling tank.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4A is a top view of an aerator manifold of an aerator system in accordance with an embodiment of the present invention;

FIG. 4B is a front view of the aerator manifold of FIG. 4A;

FIG. 4C is a side view of the aerator manifold of FIG. 4A;

DETAILED DESCRIPTION OF THE INVENTION

Figure 1:
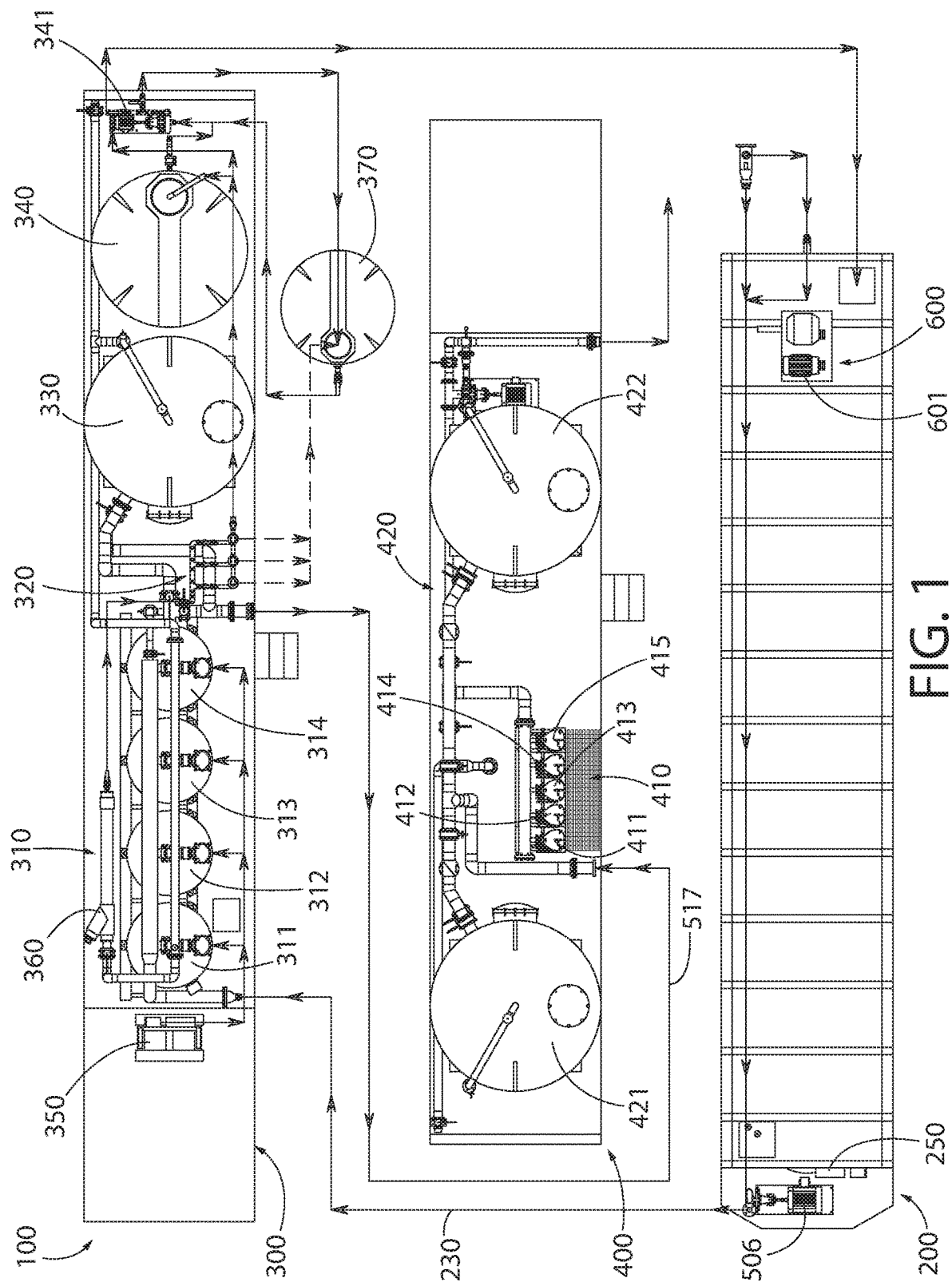
FIG. 1 is a plan view of a wastewater treatment system in accordance with an embodiment of the present invention.
Figure 2A:
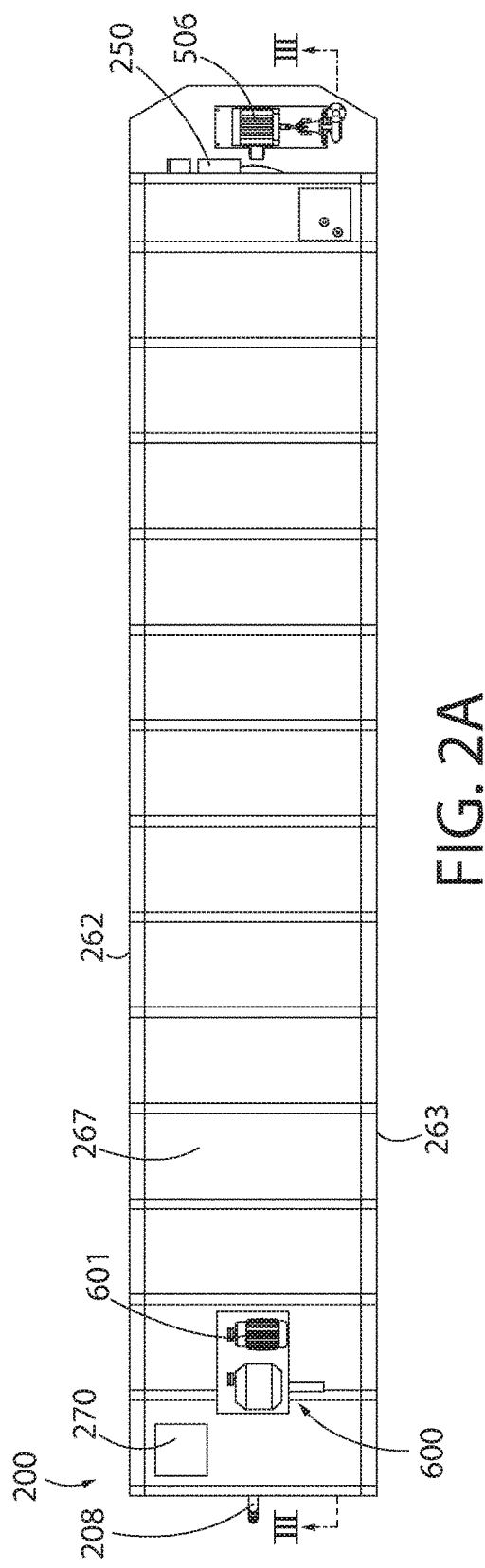
FIG. 2A is a top view of a holding tank of the system of FIG. 1.
Figure 2B:
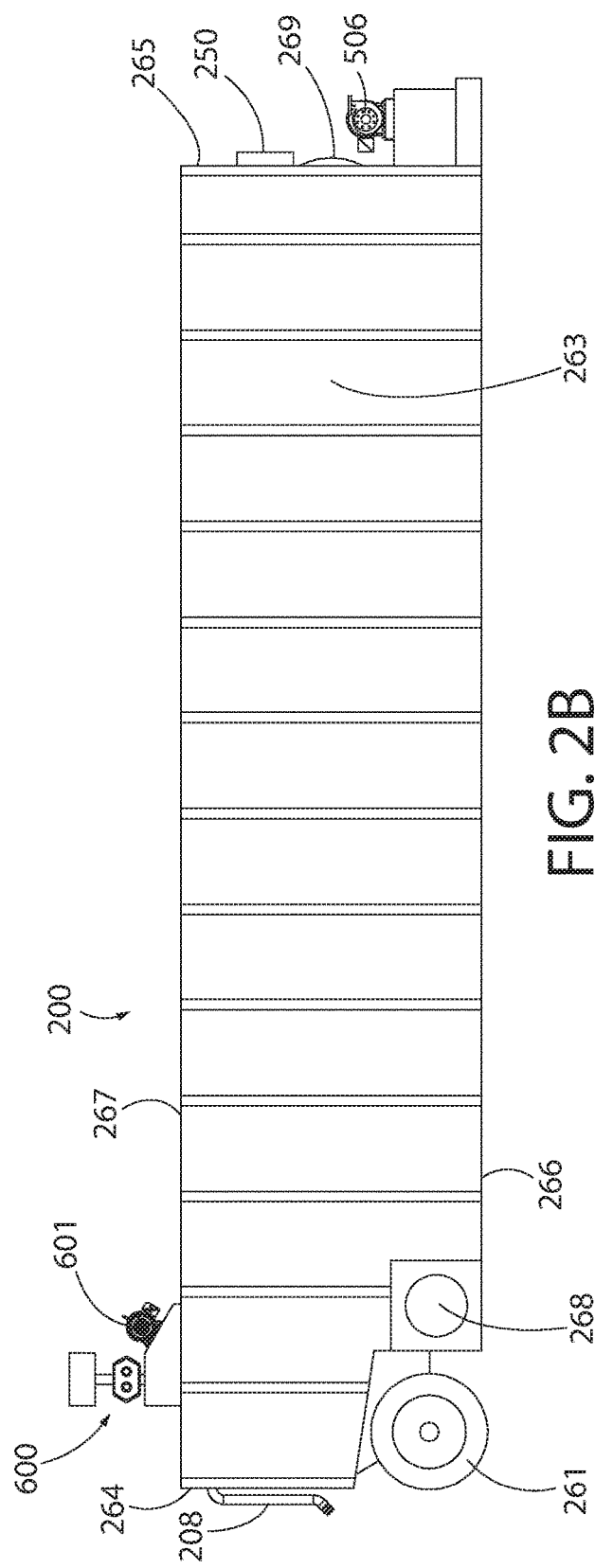
FIG. 2B is a side view of a holding tank of the overall system of FIG. 1.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

The present invention is directed to a system and a method for the treatment of wastewater. The system is in certain embodiments a groundwater treatment system that can be used to treat water at multiple sites during construction, such as during the installation of a pipeline. Wastewater from construction sites can include construction site surface run-off, wastewater from vehicle washing, wastewater from site toilet, canteen and plant maintenance facilities, wastewater from boring works and the like. The system can remove a variety of contaminants as discussed below, can be used at various flow rates, and is mobile and easily serviced. In certain embodiments, the system can treat wastewater to desired or required discharge limitations at a flow rate of up to and including 500 gallons per minute. In the exemplified embodiment, the invention is directed to a three trailer system whereby the three trailers are fluidly and operably coupled together to perform a wastewater treatment regimen. Each of the trailers performs a different treatment regimen, and thus the invention allows for a plug and play type of wastewater treatment system where trailers can be swapped in and out for each other in accordance with the needs of a particular site that contains wastewater that needs treatment. The invention will be described with particular reference to the embodiment depicted in the drawings, but it should be appreciated that various permutations are possible.

The system of the present invention is able to remove at least the following contaminants from wastewater: iron, gamma-BHC, chromium, nickel, zinc, arsenic, copper, mercury, selenium, lead, beryllium, chlorobenzene, tetrachloroethylene, 1, 1, 1-trichloroethane, trichloroethylene, benzene, ethylbenzene, toluene, benzo (a) anthrecene, chrysene, phenol, naphthalene, diedrin and others. The system may not remove all of the contaminants completely from the wastewater, but it does so to enable the water being discharged from the system to meet discharge limitations. Specifically, when the water is discharged from the system after treatment, the water may be discharged to a fresh water stream, an ocean, a lake or any other body of water. If the wastewater is not treated prior to such discharge, the wastewater can damage the ecosystem of those downstream water bodies. Wastewater discharged from construction sites is monitored and must meet strict discharge limitations in terms of contamination concentrations, pollutant levels and the like in order to protect the downstream water bodies and their ecosystems. Thus, the water being discharged can not be a pollutant or contain high levels of contamination. Thus, the above contaminants and others are removed or reduced so as to sufficiently meet these pre-set discharge limitations. For example, in one embodiment the wastewater may enter the inventive system having 151,000 ug/L of iron and the discharge limitation may be that the iron can be at a maximum of 2,000 ug/L. The inventive system will properly reduce the iron concentration to at or below 2,000 ug/L. The same can be said of each and every one of the above listed contaminants (and others not listed).

Referring first to FIG. 1, the invention is directed to a system for the treatment of wastewater 100 comprising a holding tank 200, a first trailer 300 and a second trailer 400. In certain embodiments, the holding tank 200 can be a trailer as well, such as a trailer that contains a tank or any other type of container for holding fluids thereon. However, in the exemplified embodiment the holding tank 200 is a frac tank. Each of the holding tank 200, the first trailer 300 and the second trailer 400 are mobile units that can be movable on their own or via attachment to a truck having a motor. During use of the system 100, untreated wastewater is introduced into the holding tank 200 where the untreated wastewater is stored prior to being introduced into the first and second trailers 300, 400. Various treatments may occur within the holding tank 200 to begin the process of removing larger contaminants or to ensure that solid particles remain suspended within the fluid contained within the holding tank 200 rather than accumulating on a floor of the holding tank 200. In certain embodiments, the untreated wastewater is introduced into the holding tank 200 from a source of untreated wastewater. However, the invention is not to be so limited and in other embodiments the wastewater may undergo some form of treatment prior to being stored in the holding tank 200.

The holding tank 200 is fluidly coupled to the first trailer 300 by a holding tank to first trailer conduit 230. Thus, wastewater can flow from the holding tank 200 to the first trailer 300 through the holding tank to first trailer conduit 230 to receive the first treatment regimen in the first trailer 300. Furthermore, the first trailer 300 is fluidly coupled to the second trailer 400 by a first trailer to second trailer conduit 517. Further still, a slop tank 370 and a settling tank 340 that are positioned on the first trailer 300 are fluidly coupled to the holding tank 200 so that fluids and solids that are temporarily retained in the slop tank 370 and the settling tank 340 can be carried back to the holding tank 200 because the holding tank 200 has a larger holding capacity than the slop tank 370 and the settling tank 340. The details of these fluid connections between the various components of the system 100 will be described in more detail below with reference to FIGS. 7A and 7B.

Referring to FIGS. 1-3B concurrently, the holding tank 200 will be further described. In the exemplified embodiment the holding tank 200 is a 21,000 gallon frac tank. However, the invention is not to be so limited and the holding tank 200 can be any type of tank that is fluid tight and capable of holding fluids, such as wastewater, therein. The holding tank 200 in the exemplified embodiment is forty-five feet long and nine feet six inches high. However, the invention is not to be so limited and the size of the holding tank 200 and its holding capacity can be larger or smaller than that noted above. The holding tank 200 comprises a pair of wheels 261 so that the holding tank 200 is mobile and can be moved by attaching the holding tank 200 to a trailer, truck or the like. The holding tank 200 has a first inlet port 207 that introduces wastewater into a bottom portion of the holding tank 200 and a second inlet port 208 that introduces wastewater into a top portion of the holding tank 200. In the exemplified embodiment the bottom portion of the holding tank 200 can be any portion of the holding tank that is below a mid-point of the holding tank 200 and the top portion of the holding tank 200 can be any portion of the holding tank 200 that is above the mid-point of the holding tank 200, the mid-point being the central point between a roof 267 and a floor 266 of the holding tank 200. Thus, wastewater can be introduced into the holding tank 200 at two different elevations simultaneously or alternatingly as desired.

In the exemplified embodiment, a pump 506 is positioned on the holding tank 200 for pumping the wastewater through the system 100. However, the pump 506 need not be positioned directly on the holding tank 200, but should be fluidly coupled to one or more exit or outlet ports on the holding tank 200 (discussed in more detail below) for drawing wastewater from the holding tank 200 for further processing and/or treatment. In certain embodiments the pump 506 is the only pump required for flowing the wastewater from the holding tank 200, through the first trailer 300, through the second trailer 400 and to discharge at flow rates of up to 500 gallons per minute. However, in other embodiments additional pumps may be used to facilitate or enhance the flow of the wastewater through the system 100. The details of the pump 506 will be described in more detail below.

The holding tank 200 in the exemplified embodiment has four sidewalls 262, 263, 264, 265, the floor 266 and the roof 267. In the exemplified embodiment, the holding tank 200 is a fully enclosed housing. However, in other embodiments the roof 267 may be omitted and the holding tank 200 may have an open top end. In the exemplified embodiment, a manhole 268 is positioned on the sidewall 263 and another manhole 269 is positioned on the sidewall 265. The manholes 268, 269 permit an operator access to the inside of the holding tank 200 for any necessary maintenance. A vent 270 is also illustrated formed into the roof 267 of the holding tank 200. However, the vent 280 may be omitted or positioned in any other location on the holding tank 200 as desired.

Furthermore, a first control panel 250 is coupled to the holding tank 200. The first control panel 250 comprises a processor, central processing unit or other computing mechanism to enable the first control panel 250 to obtain measurements and information from various components of the system 100 and to control the opening and closing of automatic valves and the actuation of the various system pumps to ensure proper operation of the system including proper wastewater flow rates, proper contamination reduction levels, and the like. Thus, via the processor, the first control panel 250 is able to carry out instructions based on pre-programmed algorithms and based on information provided to the control panel 250 from the system components to which the control panel 250 is operably coupled. The various components with which the first control panel 250 is in operable communication will be discussed in more detail below with reference to FIGS. 3, 7A and 7B. Furthermore, the details of the first control panel 250 will be discussed in detail below with reference to FIG. 8A.

Furthermore, an aerator system 600 is attached to the holding tank 200. More specifically, the aerator system 600 comprises a blower 601 and one or more conduits 602 coupled to the blower 601. In one embodiment, the blower 601 is mounted directly to the holding tank 200. In the exemplified embodiment, the blower 601 is directly mounted to the roof 267 of the holding tank 200. Furthermore, in certain embodiments the direct mounting between the blower 601 and the roof 267 of the holding tank 200 is accomplished by welding the blower 601 directly to the roof 267 of the holding tank 200 at weld points 299. However, the invention is not to be so limited and the blower 601 can be mounted to locations on the holding tank 200 other than the roof 267, and the blower 601 can be mounted to the holding tank 200 using techniques other than welding, such as adhesion, fasteners, screws, nails and the like. However, in some embodiments the blower 601 is permanently mounted to the holding tank 200 such that the blower 601 forms an integral part of the holding tank 200.

Figure 3:
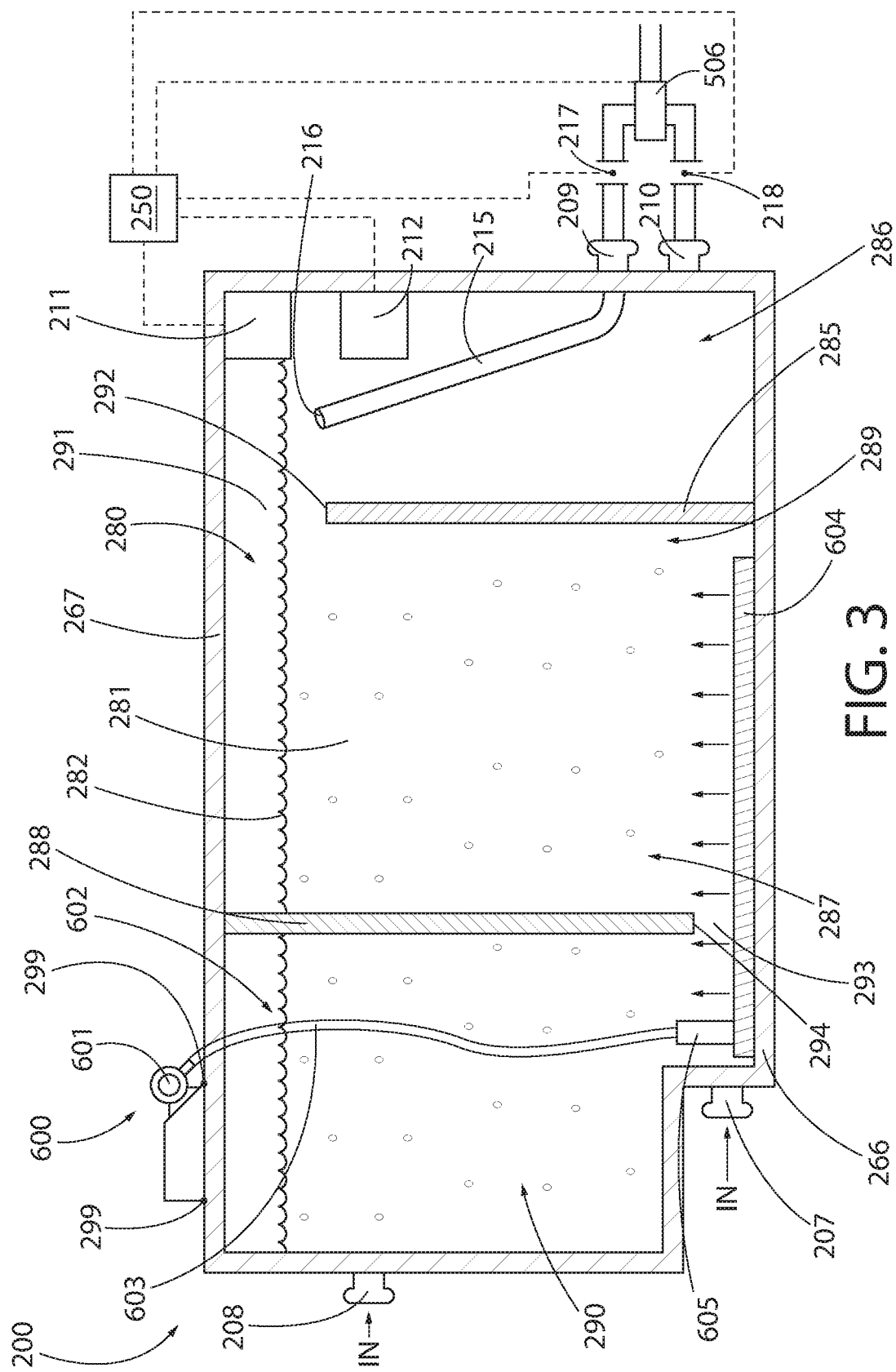
FIG. 3 is a schematic cross-sectional view taken along line III-III of FIG. 2A.

Turning now to FIG. 3 only, the internal components of the holding tank 200 will be described along with the operation of the aerator system 600. The holding tank 200 has a hollow inner cavity 280 that is used for containing a body of fluid, such as wastewater, having a surface level. In the exemplified embodiment, a body of fluid 281 (i.e., wastewater or untreated wastewater) is illustrated positioned within the inner cavity 280. The body of fluid 281 has a surface level 282, the level of which can change based on the flow of the wastewater into the holding tank 200 through the ports 207, 208 and out of the holding tank 200 through a first exit port 209 and a second exit port 210. Positioned within the inner cavity 280 is a high float 211 and a normal float 212. Each of the high float 211, the normal float 212 and the pump 506 are operably coupled to the control panel 250. Thus, the control panel 250 can control operation of the pump 506 and can control the flow of wastewater into and out of the holding tank 200 based on information obtained from the high float 211 and the normal float 212. For example, if the high float 211 is activated, the control panel 250 will obtain information that the level of the wastewater within the holding tank 200 is high and that the flow of the wastewater into the holding tank 200 should be reduced while the wastewater continues to be drawn from the holding tank 200. When the normal float 212 transmits information to the control panel 250 that the surface level of the wastewater is low, the control panel 250 may reduce the speed or turn off the pump 506 so that the flow of the wastewater being drawn from the holding tank 200 is slowed down in order to enable the surface level of the wastewater or body of fluid 281 to be increased.

A first weir 285 is positioned within the inner cavity 280 of the holding tank 200 and divides the inner cavity 280 into a discharge chamber 286 and an aeration chamber 287. Furthermore, in certain embodiments a second weir 288 may also be positioned within the inner cavity 280 of the holding tank 200 to divide the aeration chamber 287 into a first aeration chamber 289 and a second aeration chamber 290. However, the second weir 288 is not used in all embodiments and may be omitted. Furthermore, in certain embodiments both the first and second weirs 285, 288 can be omitted and the holding tank 200 can have an open, uninterrupted inner cavity 280. As used herein a weir is intended to mean a wall or other structure that prohibits free flow of the body of fluid 281 between the various chambers while permitting some flow of the body of fluid 281 between the various chambers.

In the exemplified embodiment, the floor of the second aeration chamber 290 has multiple levels. However, in other embodiments the floor of the second aeration chamber 290 can be flat or the raised floor portion of the second aeration chamber 290 can be separated off from the second aeration chamber 290. The exact locations of the first and second weirs 285, 288 is not limiting of the present invention. It is merely desired that the inner cavity 280 can be divided into the discharge chamber 286 and the aeration chamber 287, and that in some embodiments the aeration chamber 287 can be divided into the first aeration chamber 289 and the second aeration chamber 290, regardless of the relative sizes of those chambers.

In the exemplified embodiment the first weir 285 is coupled to the floor 266 of the holding tank 200, but a gap 291 exists between a top edge 292 of the first weir 285 and the roof 267 of the holding tank 200. Thus, the body of fluid 281 can pass from the aeration chamber 287 into the discharge chamber 286 through the gap 291, such that the discharge chamber 287 is an overflow chamber. In certain embodiments, the first weir 285 may extend all the way to the roof 267 of the holding tank 200 but may have openings formed therein in a top portion thereof to enable the body of fluid 281 to flow through the openings and into the discharge chamber 286. Thus, the aeration chamber 297, and more specifically the first aeration chamber 289, is in fluid communication with the discharge chamber 286 because the wastewater is able to flow between those two chambers within the gap 291.

In the exemplified embodiment the second weir 288 is coupled to the roof 267 of the holding tank 200, but a gap 293 exists between a bottom edge 294 of the second weir 288 and the floor 266 of the holding tank 200. Thus, the body of fluid 281 can flow through the gap 293 to flow between the first aeration chamber 289 and the second aeration chamber 290. Again, in certain embodiments the second weir 288 can extend all the way to the floor 266 of the holding tank 200, but may include openings near a bottom thereof to enable fluid flow therethrough. Furthermore, in certain embodiments the first weir 285 may be coupled to the roof 267 but not to the floor 266 and the second weir 288 may be coupled to the floor 266 but not to the roof 267. In still other embodiments, each of the first and second weirs 285, 288 may be coupled to the floor 266 but not the roof 267 or to the roof 267 but not the floor 266.

In the exemplified embodiment, the first and second weirs 285, 288 create a tortuous flow path of the body of liquid 281 within the inner cavity 280 from the second aeration chamber 290 to the discharge chamber 286. Specifically, the wastewater is introduced into the holding tank 200, and more specifically into the second aeration chamber 290, via one of the inlet ports 207, 208. The wastewater can flow from the second aeration chamber 290 into the first aeration chamber 289 through the gap 293 in the bottom portion of the holding tank 200. The wastewater can flow from the first aeration chamber 289 to the discharge chamber 286 through the gap 291 in the upper or top portion of the holding tank 200. Thus, in the exemplified embodiment the wastewater must take an under-over flow path within the holding tank to flow from the inlet ports 207, 208 to the discharge chamber 286 for discharge through the exit ports 209, 210. However, an over-under flow path, an over-over flow path, an under-under flow path or any other modification could also be used.

As noted above, the blower 601 of the aeration system 600 is mounted to the roof 267 of the holding tank 200. Furthermore, one or more conduits 602 are fluidly coupled to the blower 601 and extend from the blower 601 to the inner cavity 280 through an opening (not illustrated) in the roof 267 so that air can be introduced into the inner cavity 280. More specifically, the one or more conduits 602 comprises an air conduit 603 and a manifold 604. The air conduit 603 extends from the blower 601 to the manifold 604, and more specifically to a connector port 605 of the manifold 604. The manifold 604, the details of which are depicted in FIGS. 4A-C and will be described in more detail below, is positioned on the floor of the aeration chamber 287 of the inner cavity 280 of the holding tank 200. Thus, in the exemplified embodiment the manifold 604 is positioned within the first aeration chamber 289 and the second aeration chamber 290, but is not positioned within the discharge chamber 286. As a result, when the blower is activated and turned on, air, oxygen or some form of gas is introduced into the first and second aeration chambers 289, 290 from the floor of the aeration chambers 289, 290 but is not also introduced into the discharge chamber 286. Thus, due to the positioning on the floor of the aeration chamber 287, the air blows upwardly from the manifold 604 on the floor of the aeration chambers 289, 290 into the first and second aeration chambers 289, 290. This causes bubbles to form in the body of fluid 281 that is within the first and second aeration chambers 289, 290 while bubbles are not formed in the body of fluid 281 that is within the discharge chamber 286.

The blowing of air into the body of fluid 281 prevents solid materials that are suspended within the body of fluid 281 from accumulating or gathering on the floor of the holding tank 200. Because the body of fluid 281 is withdrawn from the discharge chamber 286, air does not need to also be blown into the discharge chamber 286. In certain embodiments, the air is introduced up to 500 CFM (cubic feet per minute). Thus, the aeration system 600 causes the particles in the body of fluid or wastewater 281 to remain suspended therein rather than collecting on the bottom of the holding tank 200. The aeration system 600 further causes iron that is in the body of fluid or wastewater 281 to oxidize and precipitate for removal by the treatment regimens that occur within the first and second trailers 300, 400. This enables the system 100 to remove the contaminants and solids from the body of fluid or wastewater 281 rather than leaving those contaminants and solids within the holding tank 200. In certain embodiments, the blower 601 of the aeration system 600 can be altered between an off state whereby it is never running and an on state whereby it runs after a five second delay.

As noted above, the holding tank 200 comprises a first exit port 209 and a second exit port 210, each of which is operably coupled to the pump 506 for drawing the body of fluid 281 from the holding tank 200 (i.e., from the discharge chamber 286 of the holding tank 200) and introducing the body of fluid 281 into the first trailer 300. The second exit port 210 is located near a bottom of the holding tank 200 and when the proper valves are open and the pump 506 is activated, fluid or wastewater will be drawn from the bottom of the holding tank 200 through the second exit port 210 (i.e., from a portion of the holding tank 200 below the mid-point as discussed above).

A floating intake pipe 215 is operably coupled to the first exit port 209 and extends from the first exit port 209 upwardly towards the surface level 282 of the body of fluid 281. The floating intake pipe 215 floats within the body of fluid 281. In the exemplified embodiment, the floating intake pipe 215 has an inlet 216 that is positioned beneath the surface level 282 of the body of fluid 281. In certain embodiments, the inlet 216 of the floating intake pipe 215 can be positioned at the surface level 282 of the body of fluid 281, or one inch, two inches, three inches, four inches, five inches or more below the surface level of the body of fluid 281. Regardless of the exact positioning of the inlet 216 of the floating intake pipe 215, the floating intake pipe 215 permits the body of fluid or wastewater 281 to be drawn from a top portion thereof. Furthermore, regardless of the exact level of the wastewater within the holding tank 200, the floating intake pipe 215 floats to at or beneath the surface so as to draw the wastewater from at or beneath the surface. Thus, using the holding tank 200, the wastewater or body of fluid 281 can be drawn from a top portion or surface of the body of fluid 281 using the first exit port 209 and the floating intake pipe 215 or from the bottom portion of the body of fluid 281 using the second exit port 210, or from both the top and bottom portions of the body of fluid 281 using the first and second exit ports 209, 210 simultaneously.

In certain embodiments, a valve 218 that is alterable between an open position and a closed position can be positioned between the second exit port 210 and the pump 506 and a valve 217 that is alterable between an open position and a closed position can be positioned between the first exit port 209 and the pump 506. The valves 217, 218 can be operably coupled to the first control panel 250 so that opening and closing of the valves 217, 218 can be automated. The control panel 250 may determine which of the valves 217, 218 to open based on qualities of the body of fluid or wastewater 281 including contamination levels, amount of suspended particles, amount of solid material collected on the floor of the holding tank 200, desired flow rate of the wastewater through the system as determined by discharge contamination levels or data transmitted from the floats 211, 212 or the like. Furthermore, in other embodiments the valves 217, 218 may not be coupled to the control panel 250 and opening and closing of the valves 217, 218 may occur manually by an operator.

Referring now to FIGS. 4A-C, the manifold 604 will be further described. As noted above, the manifold 604 rests on the floor of the holding tank 200 for supplying air, gas or oxygen into the holding tank 200 to aerate the body of fluid or wastewater contained in the holding tank 200. In the exemplified embodiment, the manifold 604 is a square or rectangular shaped structure having a first side 607, a second side 608, a third side 609 and a fourth side 610. Furthermore, the manifold 604 includes a center leg 611 that extends between the second side 608 and the fourth side 610. Each of the first, second, third and fourth sides 607-610 and the center leg 611 comprise a plurality of nozzles 606 therein. Thus, when the blower 601 is operably coupled to the manifold 604 as discussed above and the blower 601 is turned on, air, gas or oxygen exits the manifold 604 through each of the nozzles 606. Although one embodiment of the manifold 604 is depicted in FIGS. 4A-C, the invention is not to be limited by the shape of the manifold 604. Thus, the manifold 604 may be circular, triangular, or any other shape desired. It is merely desired that the manifold 604 be positioned within the aeration chamber 287 of the inner cavity 280 and have a plurality of nozzles 606 for introducing air into the aeration chamber 287. In some embodiments, the manifold 604 can be a solid plate-like structure having nozzle openings arranged in a linear or non-linear manner thereon.

Figure 5A:
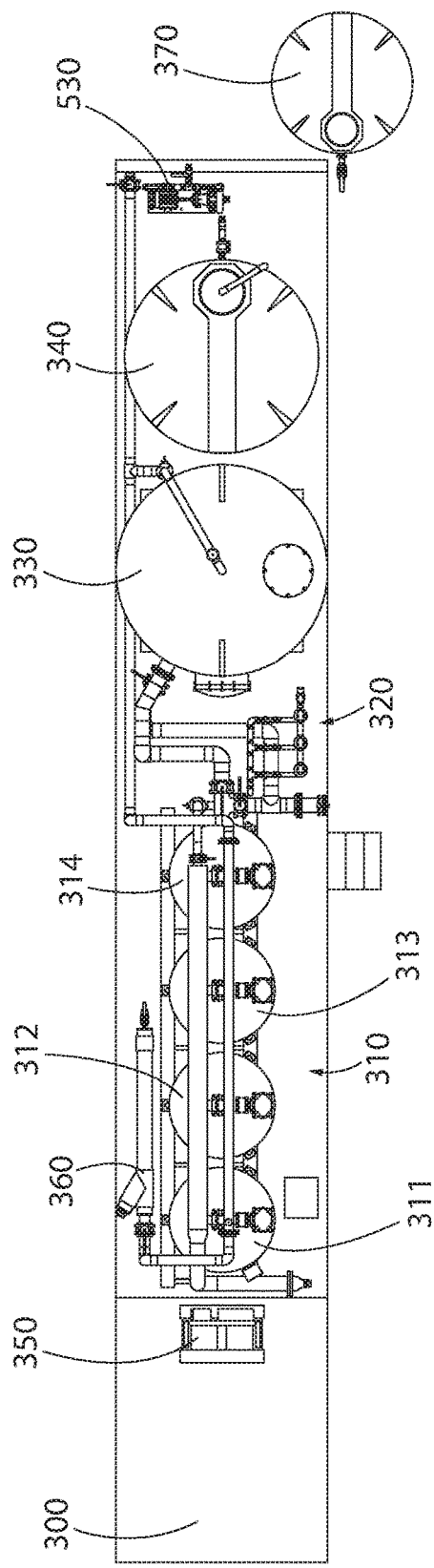
FIG. 5A is a top view of a first trailer of the system of FIG. 1.
Figure 5B:
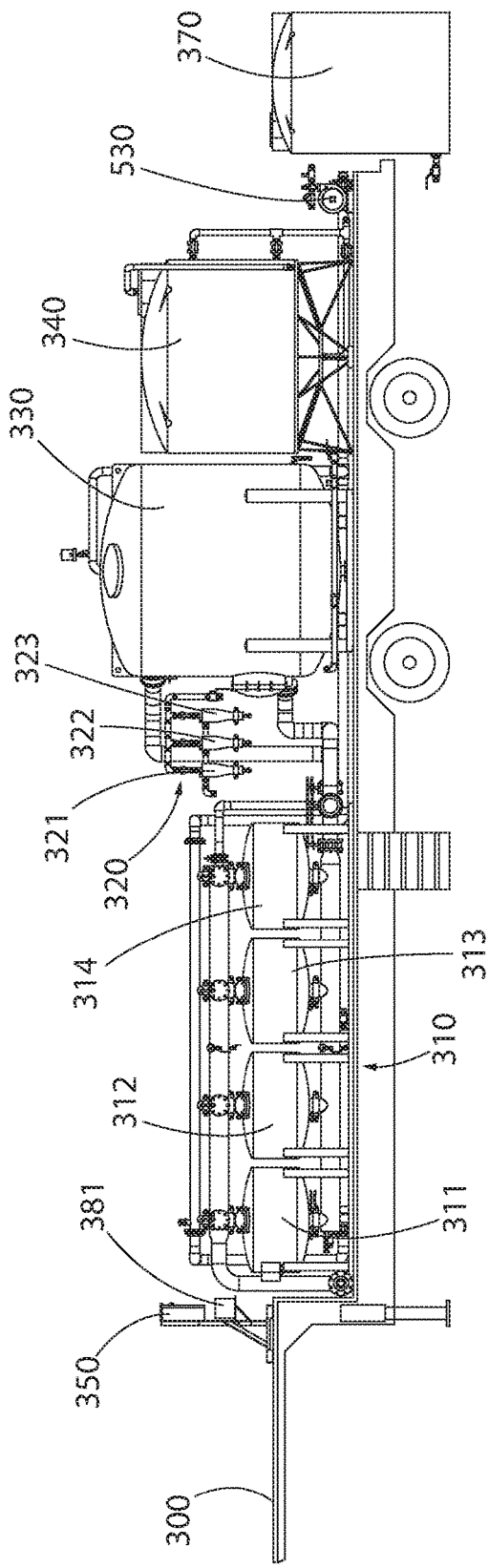
FIG. 5B is a side view of a first trailer of the system of FIG. 1.

Referring to FIGS. 1, 5A and 5B concurrently, the first trailer 300 will be further described. The first trailer 300 may be referred to herein as a first wastewater treatment trailer or a first treatment trailer. The first trailer 300 is used to provide a first treatment regimen to the untreated wastewater to form a first treated wastewater. Thus, the untreated wastewater is introduced into the first trailer 300 from the holding tank 200, the untreated wastewater undergoes a first treatment regimen while within the first trailer 300 to form the first treated wastewater, and the first treated wastewater flows from the first trailer 300 to the second trailer 400. The details of operation of the system 100 and the interoperability between the holding tank 200, the first trailer 300 and the second trailer 400 will be discussed in more detail below with reference to FIGS. 7A and 7B.

In the exemplified embodiment, the first trailer 300 is a fifty-three foot drop deck trailer. However, the invention is not to be so limited and the length of the trailer may be greater than or less than fifty-three feet in other embodiments as desired and/or needed to fit all of the components desired on the first trailer 300. Furthermore, although exemplified as a drop deck trailer that is completely open on the sides and top, the first trailer 300 may in other instances be an enclosed trailer that houses the various components described below. In the exemplified embodiment, the first trailer 300 generally comprises a sand filter system 310, at least one hydrocyclone 320, a clay tank 330, a settling tank 340, a second control panel 350, a clarifying agent injection port 360 and various gauges, flow meters, manual and automated valves and conduits fluidly coupling the components located on the first trailer 300 together to facilitate operation of the system 100. The details of the gauges, flow meters, valves and conduits will be described in more detail below with reference to FIGS. 7A and 7B.

In the exemplified embodiment there is also a slop tank 370 positioned external and adjacent to the first trailer 300. However, in other embodiments the slop tank 370 may be positioned directly on the first trailer 300 along with the other components. Furthermore, in the exemplified embodiment the first trailer 300 also has a container for storing chlorine (not illustrated), a flow control mechanism 381 for pumping the chlorine to desired locations as will be discussed in more detail below, and a pump 341 for flowing fluids in both liquid and solid form from the settling tank 340 and/or from the slop tank 370 to desired locations.

As a result of all of the components that are on the first trailer 300, the first trailer 300 is able to provide a first treatment regimen to the untreated wastewater. Although the wastewater that flows form the holding tank 200 to the first trailer 300 is referred to herein as untreated wastewater, it should be appreciated that this includes wastewater that is pre-treated wastewater, such as in instances where the wastewater is treated prior to being introduced to the first trailer 300 or prior to being introduced into the holding tank 200. The first treatment regimen that is provided to the wastewater within the first trailer 300 is achieved by flowing the wastewater through the sand filter system 310 and through the carbon tank 330, the benefits of each of which will be discussed in more detail below. Additionally, the first trailer 300 also comprises all of the components needed to properly backwash the sand filter system 310. As will be discussed in more detail below, the clarifying agent injection port 360, the hydrocyclones 320, the settling tank 340 and the slop tank 370 are used in the backwash procedure in certain embodiments. Thus, the first trailer 300 can both provide a first treatment regimen to the wastewater and perform an entire backwash of the sand filter system 310 including temporary storage of the backwashed water (in both solid and liquid forms) without the need for any additional components, trailers or the like.

In the exemplified embodiment the sand filter system 310 comprises four sand filters 311-314. Of course, the invention is not to be so limited and in other embodiments more or less than four sand filters can be used. Furthermore, in the exemplified embodiment each of the sand filters 311-314 is a sand filter tank, the sand filter tank housing the necessary materials to perform a cleaning function. The sand filter tanks 311-314 are approximately forty-eight inches in diameter and have an eighteen inch side shell. Each of the sand filter tanks 311-314 contains approximately twenty-eight cubic feet of gravel over the under drains and sixty-four feet of green sand media. In the exemplified embodiment, the sand filters 311-314 are the first stage of the filtration process in the inventive water treatment system 100. In certain embodiments, each of the sand filter tanks 311-314 comprises 2,300 pounds of green sand for a total of 9,200 pounds in all four pods/tanks and 400 pounds of ¾×½ gravel for a total of 1,600 pounds of gravel in all four pods/tanks. The gravel and the green sand media remove suspended solids from the wastewater and adsorb soluble iron from the wastewater.

Over time, the sand filters 311-314 will require a backwash as the gravel and green sand media collect and adsorb suspended solids and iron during use of the system 100. The second control panel 350 may include a processor for automating the backwash cycle, such as by being operably coupled to a solenoid valve or the like. In certain embodiments the sand filters 311-314 will be automatically backwashed when the pressure drop across the sand filters 311-314 exceeds 15 psig, 10 psig or the like. In other embodiments the sand filters 311-314 will be automatically backwashed at certain time intervals, such as one hour of operating time, thirty minutes of operating time, or the like. The second control panel 350 can be used to adjust the backwash time and pressure settings, via manual operator input, so that backwashing occurs at desired time intervals or pressure drops. The processor/control panel 350 is operably coupled to the sand filters 311-314 in order to properly initiate the backwash at the appropriate times. In the inventive system, effluent water from any three of the sand filter tanks (i.e., the water that has passed through any three of the sand filter tanks) can be used to backwash a fourth sand filter tank. The inventive backwash system will be discussed in more detail below with reference to FIGS. 7A and 7B.

In the exemplified embodiment, the at least one hydrocyclone 320 comprises a first hydrocyclone 321, a second hydrocyclone 322 and a third hydrocyclone 323. Of course, the invention is not to be limited by the number of hydrocyclones used and more or less than three can be used in other embodiments. Although denoted herein as being hydrocyclones, the at least one hydrocyclone 320 can be any type of structure that is used to classify, separate or sort particles in a liquid suspension. Thus, the hydrocyclones 320 may in some embodiments be referred to as liquid-solid separators. Hydrocyclones achieve this classification, separation or sorting based on the ratio of their centripetal force to fluid resistance.

The hydrocyclones 321-323 are used in the backwash cycle to separate the backwash water into solid material and liquid by using centrifugal force. The hydrocyclones have an inlet port that is fluidly coupled to the sand filters 311-314, a first outlet port that is fluidly coupled to the settling tank 340 and a second outlet port that is fluidly coupled to the slop tank 370. The solid material moves downwardly within the hydrocyclones in a spiral path and is gravity fed through the second outlet port to the slop tank 370. The liquid of the backwash water is forced up through the hydrocyclones due to the centrifugal force and spirals out through the first outlet port at the top of the hydrocyclones 321-323 and is collected in the settling tank 340. All of the necessary conduits, piping and the like are provided for facilitating the flow of the liquid and solid material of the backwash water noted above. The details of this process will be described in more detail below with reference to FIGS. 7A and 7B.

After the wastewater is treated by the sand filter system 310, the wastewater flows to and is treated by the clay tank 330. The clay tank 330 is an eight foot diameter vessel which contains an organically modified clay therein that attracts and adsorbs (by storing on the surface of the clay) oil, grease, hydrophobic non-polar compounds, other longer chain hydrocarbons and small amounts of heavy metals. In certain exemplified embodiments, the clay tank 330 comprises 14,000 pounds of clay/zeolite (such as an organically modified clay). However, the invention is not to be so limited and more or less than 14,000 pounds of clay/zeolite can be used in other embodiments. The clay tank 330 is rated for 75 psi and contains an influent pressure gauge, air removal system, sampling port and water distribution system. Most, if not all, of the contaminants listed above (and others not listed) that are not removed by the sand filter system 310 will be adsorbed onto the clay/zeolite media. The following is the worst case scenario of servicing the media (i.e., the clay in the clay tank 330) based on a flow rate of 500 GPM and an anticipated 7.311 mg/L of contaminant concentrations:

| Zeolite Usage | | |
|---|---|---|
| Mg/l Contaminant | 7.3110 | 7.3110 |
| gallons/minute | 500.00 | 500.00 |
| Mg/gram (adsorbtion) | 200.00 | 100.00 |
| Pounds | | |

| Zeolite Usage | | |
|---|---|---|
| Zeolite/minute | 0.15 | 0.31 |
| Zeolite/hour | 9.15 | 18.30 |
| Zeolite/day | 219.62 | 439.25 |
| Zeolite/month | 6588.75 | 13177.50 |

In the exemplified embodiment the settling tank 340 is a 1,600 gallon polyethylene tank that is used to store, in certain cases temporarily, backwashed water. Of course, the invention is not to be so limited and the settling tank 340 can be larger or smaller than 1,600 gallons and can be formed of materials other than polyethylene such as stainless steel or the like. Furthermore, in the exemplified embodiment the settling tank 340 is a cone bottom tank, but can be a flat or rounded bottom in other embodiments. As discussed above, the liquid effluent from the hydrocyclones 320 is stored in the settling tank 340 and remains there until it is pumped out and into the holding tank 200, which will be discussed in more detail below with reference to FIGS. 7A and 7B, or until it is otherwise disposed of. In the exemplified embodiment the slop tank 370 is a 1,000 gallon polyethylene tank that is used to store the solid materials that are extracted from the backwashed water. Of course, the invention is not to be so limited and the slop tank 370 can be larger or smaller than 1,000 gallons in other embodiments and can be formed of materials other than polyethylene such as stainless steel or the like. The solid materials that are stored in the slop tank 370 can be manually drained, pumped to the holding tank 200, or pumped to another location for disposal as discussed in more detail below with reference to FIGS. 7A and 7B.

Figure 6A:
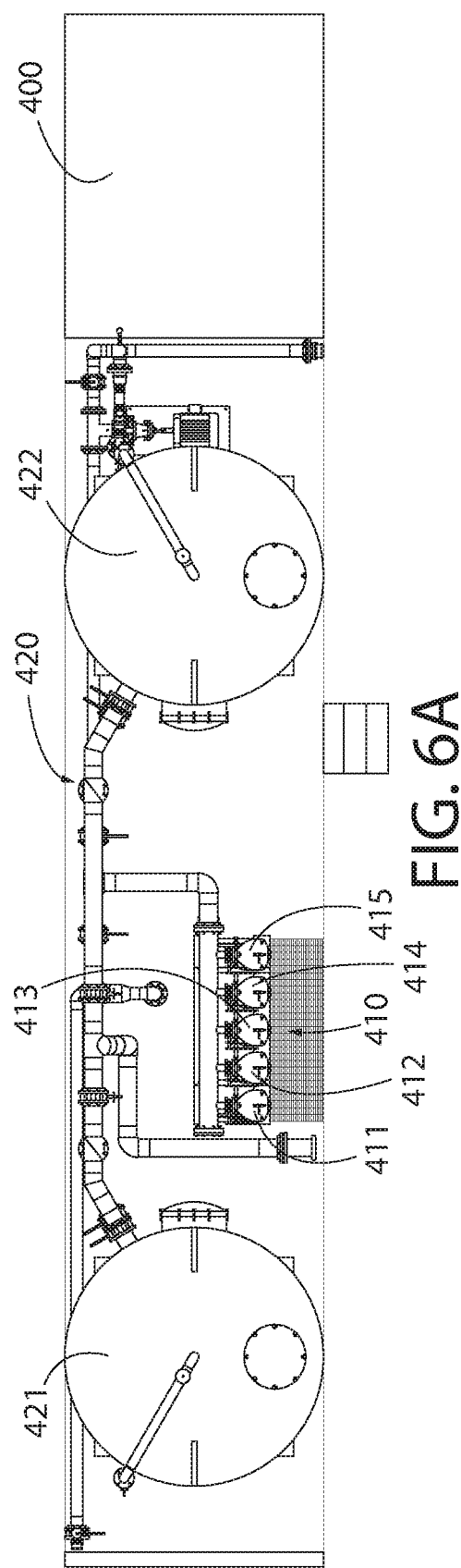
FIG. 6A is a top view of a second trailer of the system of FIG. 1.
Figure 6B:
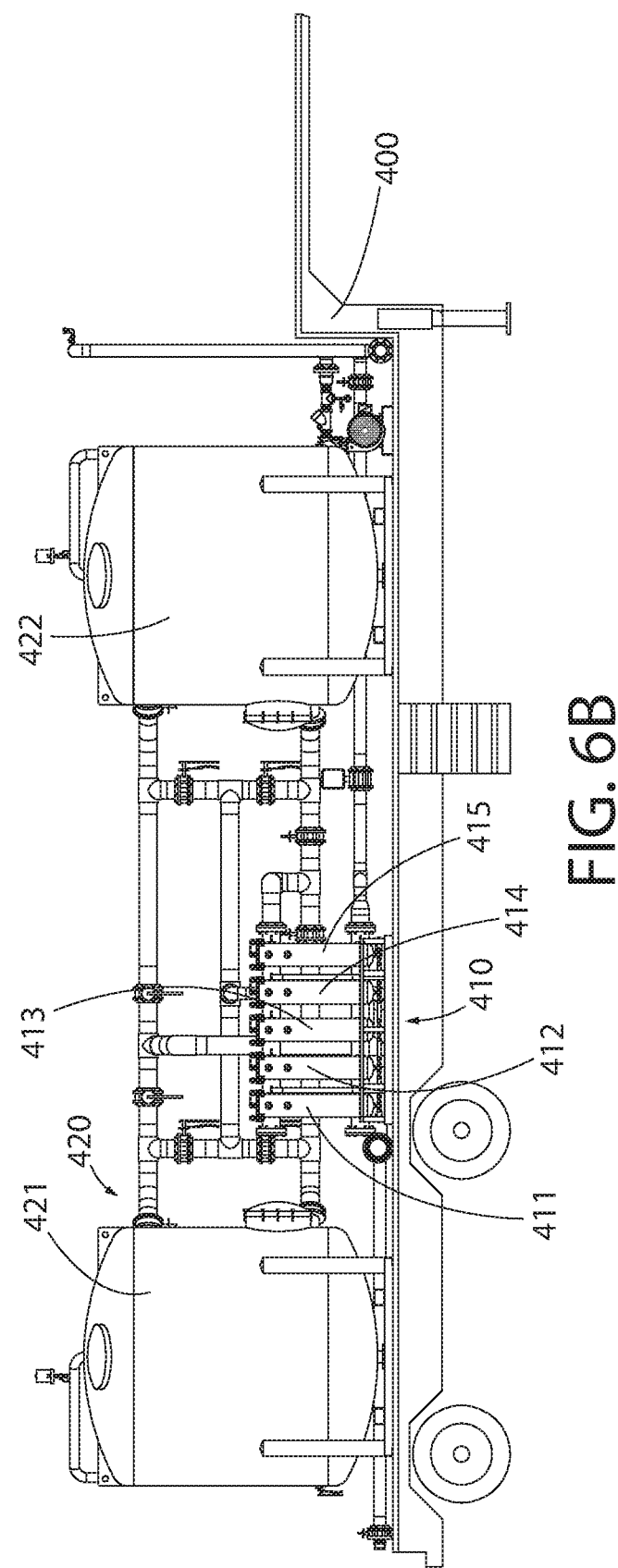
FIG. 6B is a side view of a second trailer of the system of FIG. 1.

Referring now to FIGS. 1, 6A and 6B, the second trailer 400 and the various components retained thereon will be described. The second trailer 400 may be referred to herein as a second wastewater treatment trailer or a second treatment trailer. The second trailer 400 is used to provide a second treatment regimen to the first treated wastewater that is introduced into the second trailer 400 from the first trailer 300. Thus, the first treated wastewater is introduced into the second trailer 400 from the first trailer 300, and the first treated wastewater undergoes a second treatment regimen while within the second trailer 400. In some embodiments, the first treatment regimen can be considered a filtration regimen, a solids removal regimen, a contaminant removal regimen or the like and the second treatment regimen can be considered a polishing regimen. Upon receiving the second treatment regimen, the second treated wastewater is discharged from the second trailer 400 to a desired discharge location. The second treated wastewater will have contamination levels that are within accepted discharge limitations.

In the exemplified embodiment, the second trailer 400 is a forty-eight foot drop deck trailer. However, the invention is not to be so limited and the length of the second trailer 400 may be greater than or less than forty-eight feet in other embodiments as desired or as needed to fit all of the desired components on the second trailer 400. Furthermore, although exemplified as a drop deck trailer that is completely open on the sides and top, the second trailer 400 may in other instances be an enclosed trailer that houses the various components described below. In the exemplified embodiment, the second trailer 400 generally comprises a bag filter system 410 comprising five bag filters 411-415 (although more or less than five bag filters can be used in other embodiments), a carbon filter system 420 comprising a first carbon tank 421 and a second carbon tank 422 and various gauges, flow meters, manual and automated valves and conduits fluidly coupling the components located on the second trailer 400 together to facilitate operation of the system 100. The details of the gauges, flow meters, valves and conduits will be described in more detail below with reference to FIGS. 7A and 7B.

As the first treated wastewater is introduced into the second trailer 400, the first treated wastewater first is introduced into the carbon filter system 420. As will be discussed in more detail below, the valves can be modified so that the wastewater is introduced into both of the first and second carbon tanks 421, 422 in series, or just one of the first and second carbon tanks 421, 422. In certain embodiments the wastewater may be introduced into both of the carbon tanks 421, 422 during normal operation, but can be introduced into only one of the carbon tanks 421, 422 while the carbon in one of the carbon tanks 421, 422 is being replaced. In the exemplified embodiment, each of the first and second carbon tanks 421, 422 is an eight foot diameter vessel containing activated carbon that attracts and adsorbs, on the surface of the carbon, organic molecules as well as certain inorganic molecules and metals. In the exemplified embodiment, each carbon tank 421, 422 contains approximately 10,000 pounds of granular activated carbon for a total of 20,000 pounds. Of course, the invention is not to be so limited and more or less than 10,000 pounds of granular activated carbon can be used in other embodiments. The carbon tanks 421, 422 are used to polish the first treated wastewater. In certain embodiments, the carbon tanks 421, 422 may include an interior potable water epoxy lining.

In certain exemplified embodiments, the contact time for the water to be in contact with the carbon is calculated as follows (it being appreciated that the invention is not limited to the contact times below in all embodiments):

| Contact Time | | |
|---|---|---|
| Carbon Pounds | 20000.00 | 10000.00 |
| Gallons/minute | 500.00 | 500.00 |
| Contact Time | 10.42 | 5.21 |

Based on an influent concentration of 1,875 ug/L for the remaining constituents and a flow rate of 500 gallons/minute the following is the estimated carbon usage rate (it being appreciated that the invention is not limited to the estimated carbon usage indicated below in all embodiments):

| Carbon Usage | | |
|---|---|---|
| Mg/l | 1.8750 | 1.8750 |
| gallons/minute | 500.00 | 500.00 |
| Mg/gram (adsorbtion) | 50.00 | 25.00 |
| Pounds | | |
| Carbon/minute | 0.16 | 0.31 |
| Carbon/hour | 9.39 | 18.78 |
| Carbon/day | 225.30 | 450.61 |
| Carbon/month | 6759.08 | 13518.16 |

After being polished by the carbon tanks 421, 422, the wastewater is introduced into the bag filter system 410. As discussed above, in the exemplified embodiment the bag filter system 410 comprises five bag filters 411-415. Each of the bag filters 411-415 may also be considered a bag filter tank, vessel or housing. The inventive system 100 uses one train of five bag filter tanks 411-415 in series, and the wastewater can flow through each of the bag filter tanks 411-415 or one of the five bag filter tanks 411-415 during operation. In the exemplified embodiment, each of the bag filter tanks 411-415 is thirty inches in length and eight inches in diameter. Of course, the invention is not to be so limited and lengths and diameters and other dimensions of the bag filter tanks 411-415 can be other than that noted above. The bag filter tanks 411-415 feature quick opening covers, a large area cartridge and a basket for greater product holding capacity. In certain embodiments, the bag filter tanks 411-415 are constructed of carbon steel with a Buna N standard cover gasket and a one micron bag filter is used to collect any media solids prior to discharge of the wastewater. The use of a one micron bag filter will collect and/or trap any solids or contaminants that were not previously removed using the sand filter, clay filter or carbon filter. Each bag filter tank 411-415 may have a pressure gauge before and after to monitor pressure across the bag filters. Each bag filter tank 411-415 further includes plumbing to allow isolation of the bag for servicing purposes while the remaining bag filter tanks continue operation.

Figure 7A:
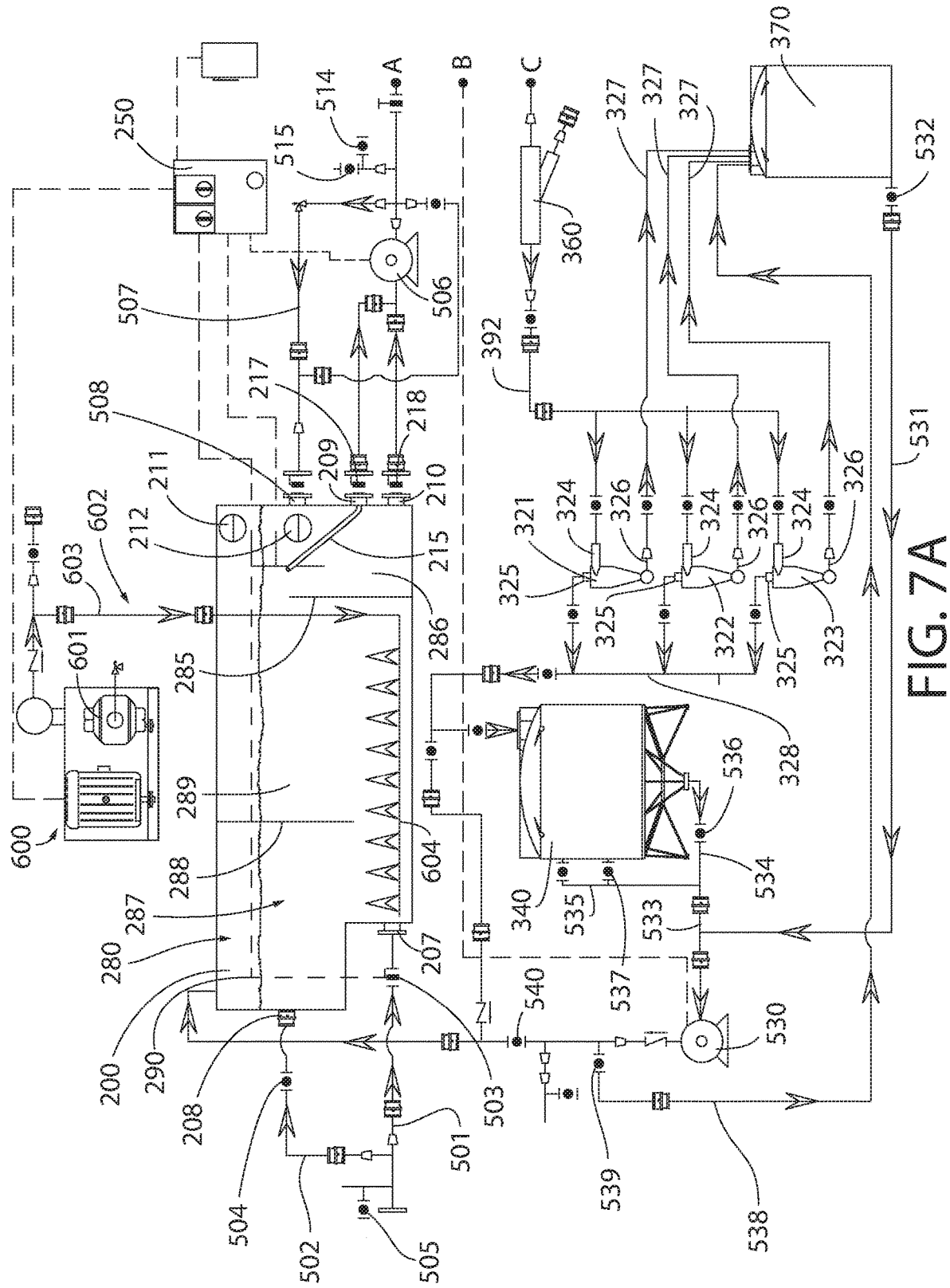
FIG. 7A is a first portion of a schematic diagram of the system of FIG. 1.
Figure 7B:
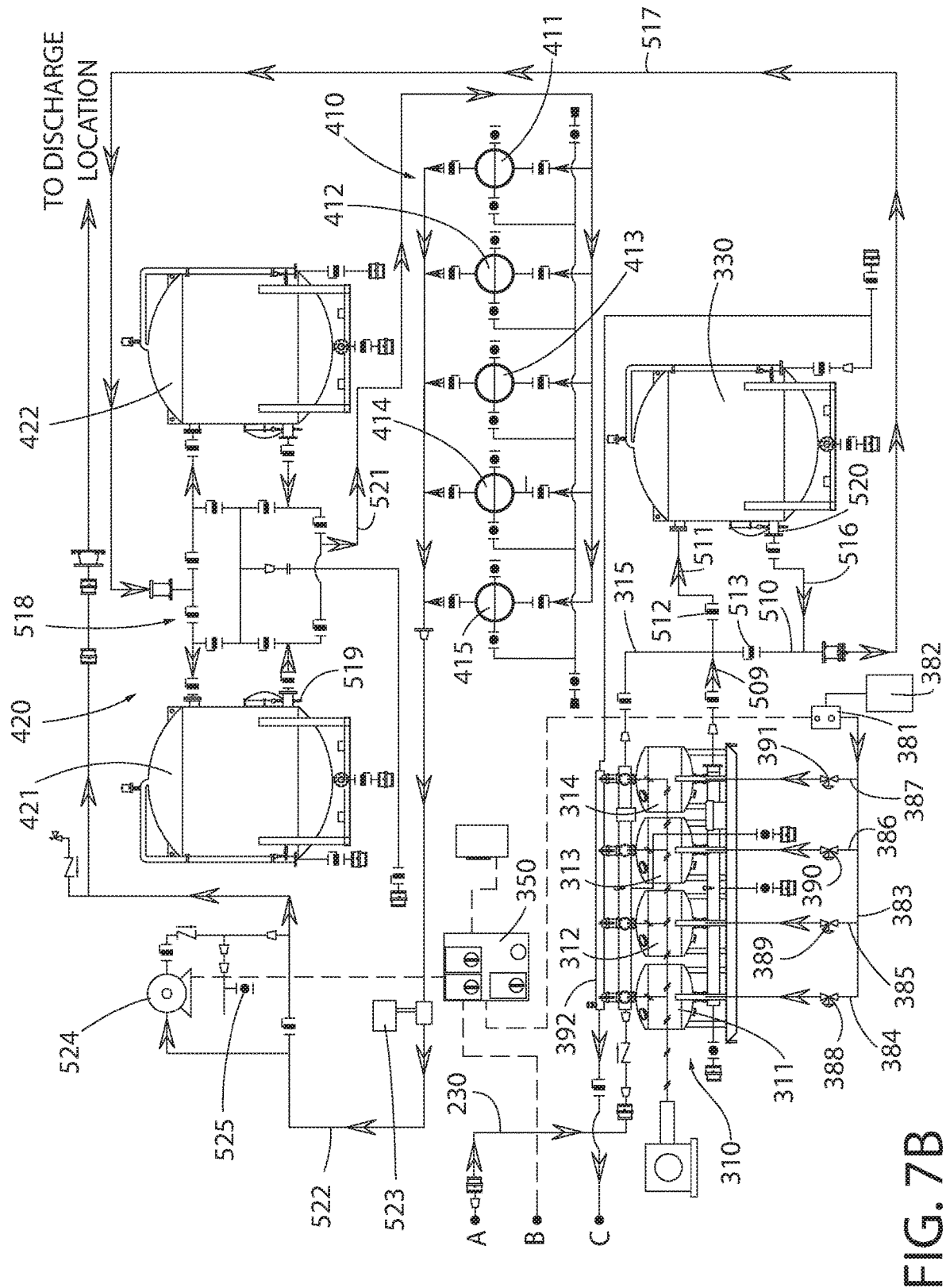
FIG. 7B is a second portion of the schematic diagram of the system of FIG. 1, wherein the nodes A, B and C are used to illustrate connection points between the first portion of the schematic diagram illustrated in FIG. 7A and the second portion of the schematic diagram illustrated in FIG. 7B.

Referring to FIGS. 7A and 7B concurrently, the system will be described in more detail along with the method of operation of the inventive system. FIGS. 7A and 7B illustrates the schematic of the system on separate pages so that the operation is more clearly visible. The nodes A-A, B-B and C-C are connected to make a single schematic out of the separate pages.

In certain embodiments, wastewater is introduced into the holding tank 200 from a well or other source of wastewater, such as a source of wastewater at a construction site. However, as discussed above the invention is not to be so limited and in other embodiments the wastewater can be introduced into the holding tank 200 from other sources. In certain embodiments, one or more pumps can be installed or positioned within a source of wastewater for pumping the wastewater from the source and into the holding tank 200. In either case, the wastewater that requires treatment is introduced into the holding tank 200 from another location. The wastewater that is introduced into the holding tank is referred to herein as "wastewater" and "untreated wastewater." Although described herein as being untreated, in certain instances the wastewater may be treated prior to being introduced into the holding tank. Thus, the term untreated wastewater merely means that the wastewater has not been treated by the inventive system. Furthermore, although the invention is described herein where untreated wastewater flows from the holding tank 200 to the first treatment trailer 300, in certain embodiments the wastewater does receive some treatment in the holding tank 200, such as the aeration discussed above. Thus, the untreated wastewater may be wastewater that has been treated by aeration in the holding tank 200.

As the wastewater approaches the holding tank 200, the wastewater flows through an inlet conduit that becomes divided into a first inlet conduit 501 and a second inlet conduit 502. Prior to the division of the inlet conduit, the wastewater passes through a sample port 505. The sample port 505 is a location along the inlet conduit at which an amount of the wastewater can be drained for testing. The specific location of the sample port 505 is not limiting of the present invention and it can be located along the first or second inlet conduits 501, 502 or at any other location prior to the wastewater being introduced into the holding tank 200. The sample port 505 can be opened to allow a portion of the wastewater to be collected for either on-site or third party testing to determine the types and concentrations of the contaminants that are in the wastewater. Testing the wastewater before the wastewater enters into the holding tank 200 can enable the operator to make any adjustments to the system 100 that may be necessary in order to deal with the contaminants and the concentrations thereof that are found in the wastewater to ensure that upon discharge the treated water meets discharge limitations.

After passing by the sample port 505, the wastewater can flow through one or both of the first inlet conduit 501 and the second inlet conduit 502. Screens can be placed along these conduit lines in order to minimize the amount of solid material that is being introduced into the holding tank 200 of the system 100 so that the various filters described herein can last longer, thereby reducing materials costs. A valve 503 is positioned along the first inlet conduit 501 to control the flow of the wastewater through the first inlet conduit 501 and a valve 504 is positioned along the second inlet conduit 502 to control the flow of the wastewater through the second inlet conduit 502. In the exemplified embodiment, the valve 504 is a manual valve and the valve 503 is an automatic valve that is operably coupled to the first control panel 250. Thus, in the exemplified embodiment the opening and closing of the valve 503 is done automatically by the control panel 250 in order to monitor and control the influx of the wastewater into the holding tank 200. The opening and closing of the valve 503 can be based on information obtained from the floats 211, 213. It should be appreciated that in other embodiments the valves 503, 504 can both be automatic, both be manual, or any variation thereof.

In the exemplified embodiment, the processor in the first control panel 250 will control the opening and closing of the valve 503 in order to prevent overflow of the holding tank 200 and to achieve a desired flow rate of the wastewater into the holding tank 200. The first inlet conduit 501 is fluidly coupled to a first inlet port 207 formed into the holding tank 200 and the second inlet conduit 502 is fluidly coupled to a second inlet port 208 formed into the holding tank 200. The first inlet port 207 is positioned at a first elevation on the holding tank 200 and the second inlet port 208 is positioned at a second elevation on the holding tank 200, the second elevation being greater than the first elevation. Thus, wastewater introduced through the second inlet port 208 is introduced near a top portion of the holding tank 200 whereas wastewater introduced through the first inlet port 207 is introduced at or near a bottom portion of the holding tank 200.

As discussed above, the aerator system 600 is coupled to the holding tank 200 in order to inject or otherwise introduce air, oxygen, gas or the like into the wastewater contained in the holding tank 200. The holding tank 200 may include the first and second weirs 285, 288 to separate the inner cavity 280 of the holding tank 200 into chambers 286, 289, 290 as discussed above. Thus, in certain embodiments the air, oxygen, gas or the like is only introduced into the aeration chambers 289, 290 but not also into the discharge chamber 286. The air, oxygen, gas or the like is introduced into the holding tank 200 through the manifold 604 that is coupled to the blower 601 by the air conduit 603. The air, oxygen or gas is blown upwardly from the bottom or floor of the holding tank 200 into the wastewater contained therein.

Furthermore, as discussed above the wastewater can be drawn from the holding tank 200 through either the first exit port 209 or the second exit port 210. A floating intake pipe 215 is coupled to the first exit port 209 for drawing the wastewater from a top portion of the wastewater and the second exit port 209 draws the wastewater form a bottom portion thereof.

The pump 506 is operably coupled to the exit ports 209, 210 of the holding tank 200 to draw or pump the wastewater from the holding tank 200 for further treatment and processing in order to reduce and/or remove contaminants from the wastewater. In the exemplified embodiment, the pump 506 is a forty horsepower pump, such as the Aurora 344A-BF, 3x4xpA and the pump is capable of drawing wastewater from the holding tank 200 to the first trailer 300, to the second trailer 400 and to discharge at flow rates of up to 500 gallons per minute. However, the invention is not to be limited by the exact type of pump, the exact horsepower of the pump or the exact flow rate of the wastewater through the system and various modifications can be used to achieve different flow characteristics.

The pump 506 is operably coupled to the first control panel 250, which monitors and controls the operation of the pump 506. The pump 506 may operate in three different modes including hand mode, in which the pump 506 is continuously operating, off mode in which the pump is never operating, and auto mode in which the pump 506 operates in accordance with the floats 211, 212. Specifically, the float 211 is a high level monitor and the float 212 is a normal liquid level float. Each of the floats 211, 212 are also operably coupled to the first control panel 250 so that the processor of the first control panel 250 can monitor the level of the wastewater within the holding tank 200 to control operation of the pump 506 when the pump 506 is set to auto mode. When the float 212 indicates that the level of the wastewater within the holding tank 200 is lower than a desired threshold, the first control panel 250 may slow down or stop the pump 506 operation in order to enable the level of the wastewater within the holding tank 200 to increase. At the same time, or alternatively, the first control panel 250 may open the valve 503 to enable the wastewater to flow into the holding tank 200 more quickly. When the float 211 indicates that the level of the liquid within the holding tank 200 is high, the first control panel 250 will ensure that the pump 506 is operating and may close the valve 503 to slow down the introduction of the wastewater into the holding tank 200. As will be discussed in more detail below, the control panel 250 also has an emergency shut-down button to enable an operator to shut down the system if needed or desired.

Furthermore, in certain instances the pump 506 may be operating at full speed and it may be determined that a component downstream of the pump 506 is getting clogged up or otherwise needs the flow of the wastewater through the system to be slowed down. Thus, the system is equipped with a recirculation conduit 507. When the valves connected to the recirculation conduit 507 are open, the wastewater (or a portion thereof) that is drawn from the holding tank 200 will be reintroduced into the holding tank 200 through an inlet port 508 in order to slow down wastewater fluid flow through the system.

After passing through the pump 506, the wastewater passes through another sample port 514 and a pressure indicator 515. The pressure indicator 515 can be a gauge that calculates a pressure measurement and provides a visual indication of system performance to an operator. Various pressure indicators and sensors can be positioned at different locations within the system 100 in order to provide an operator with the pressure of the wastewater at those locations. The sample port 514 is another location at which a sample of the wastewater can be taken so that it can be either tested on site or sent to a laboratory to determine the contamination levels of the wastewater at that location in the system.

Furthermore, after passing through the pump 506, the wastewater continues to flow to the sand filter system 310. As noted above, the sand filter system 310 is located in or on the first trailer 300 and comprises four sand filters 311-314. Thus, the wastewater is pumped from the holding tank 200 directly to the first trailer 300 where the wastewater receives a first treatment regimen from the sand filter system 310 and the clay tank 330. When the wastewater reaches the sand filter system 310, the wastewater can either be introduced into one or more of the sand filters 311-314 or the wastewater can bypass the sand filters 311, 314 by flowing through a sand filter bypass conduit 315. Generally, however, during operation of the present system, the wastewater will flow through one or more of the sand filters 311-314 in order to remove solids suspended in the wastewater and to adsorb iron from the untreated wastewater.

Thus, under normal operation of the system, the pump 506 draws the untreated wastewater from the holding tank 200 and introduces the wastewater into at least one of the sand filters 311-314. The wastewater flows into at least one of the sand filters 311-314 as untreated wastewater and flows out of the at least one sand filters 311-314 through a sand filter effluent conduit 509 as sand filtered wastewater. As the sand filtered wastewater flows through the sand filter effluent conduit 509, the sand filtered wastewater can either flow through a clay tank bypass conduit 510 or through a clay tank inlet conduit 511. The opening and closing of a valve 512 on the clay tank bypass conduit 510 and a valve 513 on the clay tank inlet conduit 511 determines whether the sand filtered wastewater will flow through the clay tank bypass conduit 510 or through the clay tank inlet conduit 511.

In general operation, the sand filtered wastewater will flow through the clay tank inlet conduit 511 and into and through the clay tank 330 whereby inorganic contaminants can be removed from the sand filtered wastewater and oil, grease and other longer chain hydrocarbons can be adsorbed. After flowing through the clay tank 330 and being treated by the clay tank 330, the wastewater becomes the first treated wastewater in that it has undergone the entire first treatment regimen, which includes treatment by the sand filter system 330 and treatment by the claim tank 330. This first treated wastewater will flow from the clay tank 330 through a clay tank effluent conduit 516, at which time the first treated wastewater will also flow from the first trailer 300 to the second trailer 400. Thus, from the clay tank effluent conduit 516, the first treated wastewater will flow through the first trailer to second trailer conduit 517 which fluidly couples the first trailer 300 to the second trailer 400 and also fluidly couples the clay tank 330 to the carbon filter system 420.

As the first treated wastewater flows through the first trailer to second trailer conduit 517, the first treated wastewater continues until it reaches a carbon filter system manifold 518. The carbon filter system manifold 518 comprises many different conduits and valves that facilitate the single or dual operation of the carbon filter tanks 421, 422 of the carbon filter system 420. Specifically, the first treated wastewater can be made to flow through one of the carbon filter tanks 421, 422 only before continuing to flow to the bag filter system 410, or the first treated wastewater can be made to flow through both of the carbon filter tanks 421, 422 in series before continuing to flow to the bag filter system 410, or the first treated wastewater can altogether bypass the carbon filter tanks 421, 422.

The carbon filter system manifold 518 comprises twelve different valves (illustrated but not labeled) that can be manually or automatically opened and closed in order to control the flow of the first treated wastewater. The first treated wastewater can flow through the carbon tank 421 and then out through a carbon tank effluent conduit 521 to take the first treated wastewater to the bag filter system 410. Alternatively, the first treated wastewater can flow through the carbon tank 421, and then through the carbon tank 422, and then through the carbon tank effluent conduit 521 to take the first treated wastewater to the bag filter system 410. Alternatively, the first treated wastewater can flow through the carbon tank 422 and then out through the carbon tank effluent conduit 521 to take the first treated wastewater to the bag filter system 410. And further still, the first treated wastewater can flow through the carbon tank 422, and then through the carbon tank 421, and then through the carbon tank effluent conduit 521 to take the first treated wastewater to the bag filter system 410.

The determination regarding whether the first treated wastewater should flow through one or both of the carbon tanks 421, 422 can be made manually by an operator or automatically by the system based on the contamination levels of the first treated wastewater as detected at a sample port 520 on the clay tank effluent conduit 516. The sample port 520 (or other type of contamination monitor) is located at some position after the first treated wastewater leaves the clay tank 330 and before the first treated wastewater is introduced into the first carbon tank 421. In the exemplified embodiment, this sample port 520 is located at the outlet or exit port of the clay tank 330, but the invention is not to be so limited and the sample port 520 can be positioned at any location along the clay tank effluent conduit 516 or along the first trailer to second trailer conduit 517.

In certain embodiments, the direction of flow of the first treated wastewater through the carbon filter system 420 (i.e., from carbon tank 421 to carbon tank 422 or from carbon tank 422 to carbon tank 421) can be changed when the first carbon tank through which the first treated wastewater reaches a predetermined degree of contamination. Specifically, if the carbon tank 421 is the first or lead carbon tank and the carbon tank 422 is the second or lag carbon tank in the direction of flow based on the opening and closing of the various valves, the wastewater can flow through the first carbon tank 421 and then through the second carbon tank 422 for a period of time. There is a sample port 519 or some other type of contamination monitor operably positioned at the exit port of the first carbon tank 421 so that the contamination levels of the wastewater after being passed through the first carbon tank 421 can be tested.

When a ratio of the contamination level of the first treated wastewater taken at the sample port 520 to the contamination level of the first treated wastewater taken at the sample port 519 is 5:1 or less (i.e., the contamination level of the water leaving the first carbon tank 421 has 20% or more of the contamination level of the water entering the first carbon tank 421), it may be determined that the first carbon tank 421 is spent. At such time, while carbon replacement is being organized, the valves of the carbon system filter manifold 518 can be adjusted so that the first treated wastewater flows first through the second carbon tank 422 and then through the first carbon tank 421, or only flows through the second carbon tank 422, such as when the carbon in the first carbon tank 421 is being replaced. Thus, utilizing the inventive system operation can continue even while the carbon is being replaced in one of the carbon tanks 421, 422 due to the redundancy of the carbon tanks 421, 422. The carbon filter system manifold 518 allows backwashing of the carbon tanks 421, 422 and swapping of lead and lag carbon tanks 421, 422 without the need to remove or swap any hoses or conduits.

After the first treated wastewater passes through the carbon filter system 420 and out into the carbon tank effluent conduit 521, the first treated wastewater is introduced into the bag filter system 410. The bag filters or bag filter tanks 411-415 of the bag filter system 410 are arranged in series so that the first treated wastewater can flow through one, two, three, four or all five of the bag filters 411-415 of the bag filter system 410. After the first treated wastewater flows through the bag filter system 410, the first treated wastewater becomes second treated wastewater and the second treated wastewater flows along and through a discharge conduit 522.

A flow meter 523 is positioned along the discharge conduit 522 in order to monitor the flow rate of the second treated wastewater. Furthermore, an additional pump 524 is positioned along the discharge conduit 522. The additional pump 524 can be a 15 horsepower pump that has an optional use to boost the flow rate of the second treated wastewater as it flows along and through the discharge conduit 522. Of course, the additional pump 524 can have a horsepower that is above or below 15 in other embodiments. For example, in certain embodiments the discharge conduit 522 may be excessively long, such as five thousand feet long, in order to carry the second treated wastewater to a desired location. In such embodiments the pump 506 may not be powerful enough to carry the second treated wastewater all the way to the discharge location, in which case the additional pump 524 may provide the additional power needed. The additional pump 524 is operably coupled to the second control system 350, which monitors flow rates of the wastewater throughout the system and determines whether the use of the additional pump 524 is desired or required.

Furthermore, a final sample port 525 is located along the discharge conduit 522 to perform a final test of the second treated wastewater to ensure that the second treated wastewater is meeting discharge limitations. Specifically, it must be ensured that the contamination levels of the contaminants in the second treated wastewater are at or below legal or desired discharge limitations, which may change depending on the location to which the second treated wastewater is being discharged to. Finally, after passing through the sample port 525, the second treated wastewater continues to flow through the discharge conduit 522 all the way to the desired discharge location. The second treated wastewater will have contamination levels that are at or below accepted or required discharge limitations, which can be dependent upon the discharge location.

Still referring to FIGS. 7A and 7B concurrently, backwashing of one or more of the sand filters 311-314 will be described. The entire backwashing process takes place on the first trailer 300 because the first trailer 300 has all of the components that are used during the backwashing process positioned thereon (or adjacent thereto), including the sand filters 311-314, the hydrocyclones 321-323, the settling tank 330 and the slop tank 370 (which may be positioned on the first trailer 300 is adjacent to the first trailer 300).

As discussed above, in certain embodiments backwashing of the one or more sand filters 311-314 occurs automatically based on a preset timing interval or a predetermined pressure differential across the sand filters 311-314. When the preset timing interval or predetermined pressure differential across the sand filters 311-314 is reached, the system will automatically begin a backwash cycle. One or more of the sand filters 311-314 can be backwashed at the same time, but all of the sand filters 311-314 cannot be backwashed at the same time. This is because the water that is used to backwash the sand filters 311-314 is the water that is passing through the other sand filters 311-314 that are not being backwashed.

Specifically, in the present invention there is a first sand filter 311, a second sand filter 312, a third sand filter 313 and a fourth sand filter 314. The water that enters into each of the first, second, third and fourth sand filters 311-314 is the untreated wastewater that is being drawn from the holding tank 200. After the untreated wastewater passes through the sand filters 311-314, the untreated wastewater becomes sand filter treated wastewater. Thus, for example, if only the first sand filter 311 is being backwashed, the sand filter treated wastewater that is exiting one or more of the second, third and fourth sand filters 312, 313, 314 along the sand filter effluent conduit 509 is used in this backwashing procedure. The untreated wastewater flows through the sand filters 311-314 in a first direction during normal processing, and the sand filter treated wastewater flows through the sand filters 311-314 in a second direction during backwashing, the second direction being opposite the first direction.

The flow control mechanism 381 is operably coupled to the second control panel 350 and to a container 382. In the exemplified embodiment, the container 382 is a five gallon bucket, but the invention is not to be so limited and the container 382 can be larger or smaller than five gallons in other embodiments. The container 382 stores chlorine therein which is introduced into the sand filters 311-314 during backwashing. In the exemplified embodiment, the flow control mechanism 381 is a pump, and more specifically a four gallon per hour electronic metering pump that transfers chlorine into the sand filters 311-314 while they are in the backwash cycle. Of course, the invention is not to be so limited and the flow control mechanism 381 can be a pump having a faster or slower operation than that described above. Furthermore, the invention is not limited to the flow control mechanism 381 being a pump in all embodiments, and in certain other embodiments the flow control mechanism 381 can be a valve that is alterable between an open state and a closed state. In such an embodiment, the container 382 can be pressurized so that upon the valve being actuated into the open state, chlorine will flow into the sand filters 311-314 at a desired flow rate.

The flow control mechanism 381 can be operated in a hand (or always on) mode, an off (or never on) mode, and an auto mode. In the auto mode, the flow control mechanism operates (i.e., the pump activates and pumps chlorine from the container 382 into the sand filters 311-314 that are being backwashed or the valve opens to flow chlorine from the container 382 into the sand filters 311-314 or the like) immediately and automatically upon detecting such backwash. In certain embodiments, backwash can be detected when a backwash solenoid is energized into an "on" mode. Thus, when the flow control mechanism 381 is in the auto mode, upon the solenoid being energized and one or more of the sand filters 311-314 being backwashed, the second control panel 350 will automatically begin injecting or introducing chlorine into the sand filter(s) 311-314 that are being backwashed via operable communication with the flow control mechanism 381.

Specifically, when the flow control mechanism 381 is in the auto mode, upon the initiation of backwashing of one or more of the sand filters 311-314 (which may be manually initiated or automatically initiated as discussed above), the second control panel 350 (or the processor of the second control panel 350) will transmit a signal to the flow control mechanism 381 to activate (i.e., pump chlorine from the container 382 or open a valve to enable chlorine to flow from the container 382). Thus, the chlorine is injected or introduced into the sand filters 311-314 that are being backwashed automatically. Furthermore, the chlorine continues to be injected or introduced into the sand filters 311-314 that are being backwashed during the entire period of time that such sand filters 311-314 are being backwashed. In other words, chlorine injection occurs simultaneously and contemporaneously with the backwash cycle.

The container 382 is fluidly coupled to a chlorine supply manifold 383, and a first chlorine injection conduit 384, a second chlorine injection conduit 385, a third chlorine injection conduit 386 and a fourth chlorine injection conduit 387 extend from the chlorine supply manifold 383 in a fluidly coupled manner. The first chlorine injection conduit 384 extends from the chlorine supply manifold 383 to the first sand filter 311 for injecting chlorine into the first sand filter 311 when the first sand filter 311 is being backwashed, the second chlorine injection conduit 385 extends from the chlorine supply manifold 383 to the second sand filter 312 for injecting chlorine into the second sand filter 312 when the second sand filter 312 is being backwashed, the third chlorine injection conduit 386 extends form the chlorine supply manifold 383 to the third sand filter 313 for injecting chlorine into the third sand filter 313 when the third sand filter 313 is being backwashed, and the fourth chlorine injection conduit 387 extends from the chlorine supply manifold 383 to the fourth sand filter 314 for injecting chlorine into the fourth sand filter 314 when the fourth sand filter 314 is being backwashed.

Furthermore, a valve 388 is positioned along the first chlorine injection conduit 384, a valve 389 is positioned along the second chlorine injection conduit 385, a valve 390 is positioned along the third chlorine injection conduit 386 and a valve 391 is positioned along the fourth chlorine injection conduit 387. Each of the valves 388-391 is actuatable between a closed position whereby chlorine cannot pass through the respective conduit to which it is attached and into its respective sand filter and an open position whereby chlorine can pass through the respective conduit to which it is attached and into its respective sand filter. Thus, if only the first sand filter 311 is being backwashed, the flow control mechanism 381 will be activated to pump chlorine from the container 382 into the chlorine supply manifold 383. Furthermore, the valve 388 will be open and the valves 389-391 will be closed so that chlorine can flow into the first chlorine injection conduit 384 but is prevented from entering into any of the second, third or fourth chlorine injection conduits 385-387. The opening of the valves 388-391 can be achieved automatically via operable coupling to the second control panel 350 or manually by an operator.

When the first sand filter 311 is being backwashed, the sand filtered wastewater from one or more of the second, third and fourth sand filters 312-314 will mix with the chlorine that is being injected from the container 382 before the chlorine and the sand filtered water enter into the first sand filter 311. This mixture of the sand filtered wastewater and the chlorine forms a chlorinated wastewater. The chlorinated wastewater is then introduced into the first sand filter 311 for backwashing of the first sand filter. This same process can be used to backwash any one of the second, third or fourth sand filters 311. Injecting or introducing chlorine into the sand filters 311-314 during the backwash reactivates the green sand. Thus, the backwashing process removes dissolved iron from the sand filters 311-314 and reactivates the green sand media in the sand filters 311-314.

During the backwash cycle, the chlorinated wastewater is introduced into the sand filter(s) 311-314 that are being backwashed in the second direction as discussed above, which is opposite the direction of flow of wastewater through the sand filters 311-314 during normal operation. The chlorinated wastewater is introduced into the sand filters 311-314 and backwashed water exits the sand filters 311-314. The backwashed water enters into a backwash conduit 392 and flows through the backwash conduit 392 in the direction of the arrows towards node C-C. As noted above, the clarifying agent injection port 360 is positioned along the backwash conduit 392 for injecting a clarifying agent into the backwashed water. The clarifying agent is any type of flocculent or polymer that causes solids that are in the backwashed water to flocculate or accumulate together into a mass. An example of a clarifying agent that can be used is chitosan or any other polymer that is designed to flocculate solids that are suspended within a fluid. In certain embodiments, the clarifying agent injection port 360 can be omitted, or it may be present and unused.

After passing through the clarifying agent injection port 360, the backwash water continues to flow through the backwash conduit 392 towards the hydrocyclones 321-323. Each of the hydrocyclones has an inlet port 324 that is fluidly coupled to the backwash conduit 392 for receiving the backwash wastewater. Furthermore, a valve (illustrated but not labeled) is positioned on the backwash conduit 392 between the clarifying agent injection port 360 and the inlet port 324 of the hydrocyclones 321-323 to control which of the hydrocyclones 321-323 the backwash wastewater is to flow into. Thus, all of the valves can be opened so that the backwash water can flow into all of the hydrocyclones 321-323 or one or more of the valves can be closed to prevent backwash water from flowing into the respective hydrocyclone 321-323. As discussed above, each of the hydrocyclones 321-323 is configured to separate the backwash water into a solid material and a liquid. Specifically, by centrifugal forces, the hydrocyclones 321-323 force the liquid of the backwash water to flow upwardly and out through a first exit port 325 of the hydrocyclones 321-323 and force the solid material of the backwash water to flow downwardly and out through a second exit port 326 of the hydrocyclones 321-323.

A slop tank conduit 327 is fluidly coupled to the second exit port 326 of the hydrocyclones 321-323 and a settling tank conduit 328 is fluidly coupled to the first exit port 325 of the hydrocyclones 321-323. The solid material flows out through the second exit port 326 of the hydrocyclones 321-323, flows through the slop tank conduit 327, and flows into the slop tank 370 for temporary storage thereof. The liquid of the backwash water flows out through the first exit port 325 of the hydrocyclones 321-323, flows through the settling tank conduit 328, and flows into the settling tank 340.

The solid material can remain in the slop tank 370 and can be pumped out for disposal at a landfill or other desired location. Alternatively, the solid material in the slop tank 370 can be pumped back into the holding tank 200. Specifically, a pump 530 is fluidly coupled to the slop tank 370 by a slop removal conduit 531. The pump 530 can be a five horsepower pump, such as an Aurora 344A-BF, 1.5x2x9A pump. However, the invention is not to be limited by the model or horsepower of the pump 530 and any other desired pump can be used. A valve 532 is positioned on the slop removal conduit 531 to facilitate or prevent flow of the solid material from the slop tank 370 to the holding tank 200 when the pump 530 is activated.

The pump 530 is also operably coupled to the settling tank 540 by a settling liquid removal conduit 533. In the exemplified embodiment, the settling liquid removal conduit 533 has a first sub-conduit 534 that is operably coupled to a bottom of the settling tank 540, and a second sub-conduit 535 that is operably coupled to the settling tank 540 in a middle or top portion of the settling tank 540. A valve 536 is positioned along the first sub-conduit 534 and one or more valves 537 are positioned along the second sub-conduit 535.

Thus, when the pump 530 is activated, if the valve 532 is open, the solid material will flow from the slop tank 370 to the holding tank 200. Furthermore, when the pump 530 is activated, if the valve 536 is open, the liquid will flow from a bottom of the settling tank 340 to the holding tank 200. Finally, when the pump 530 is activated, if the valve 537 is open, the liquid will flow from a middle or top portion of the settling tank 340 to the holding tank 200. Furthermore, the pump 530 is also operably coupled to a slop tank recirculation conduit 538 and a valve 539 is positioned along the slop tank recirculation conduit 538 downstream of the pump 530. Thus, for example, when the liquid is in the settling tank 540, some solids may remain suspended in the liquid and may collect at the bottom of the settling tank 540 due to gravity. Thus, it may be desirable to operate the pump 530 with the valves 532 and 537 and a valve 540 located between the pump 530 and the holding tank 200 closed while the valves 536 and 539 are open so that solid material that has settled to the bottom of the settling tank 340 can flow from the settling tank 340 to the slop tank 370.

When the liquid from the settling tank 340 is pumped to the holding tank 200, the liquid mixes with wastewater that is introduced into the holding tank 200 as discussed above. The mixture of the liquid and the wastewater is drawn from the holding tank 200 as has been discussed in detail below and passes from the holding tank 200 to the first trailer 300, to the second trailer 400, and to discharge. Thus, the liquid of the backwash water can go back through the treatment regimens provided by the inventive system and can be discharged to a desired discharge location. By facilitating flow of the liquid and the solid material from the settling tank 340 and the slop tank 370 back to the holding tank 200, the inventive system is a completely closed loop system between the various trailers, and particularly between the first trailer 300 and the holding tank 200 with regard to the backwash cycle.

Figure 8A:
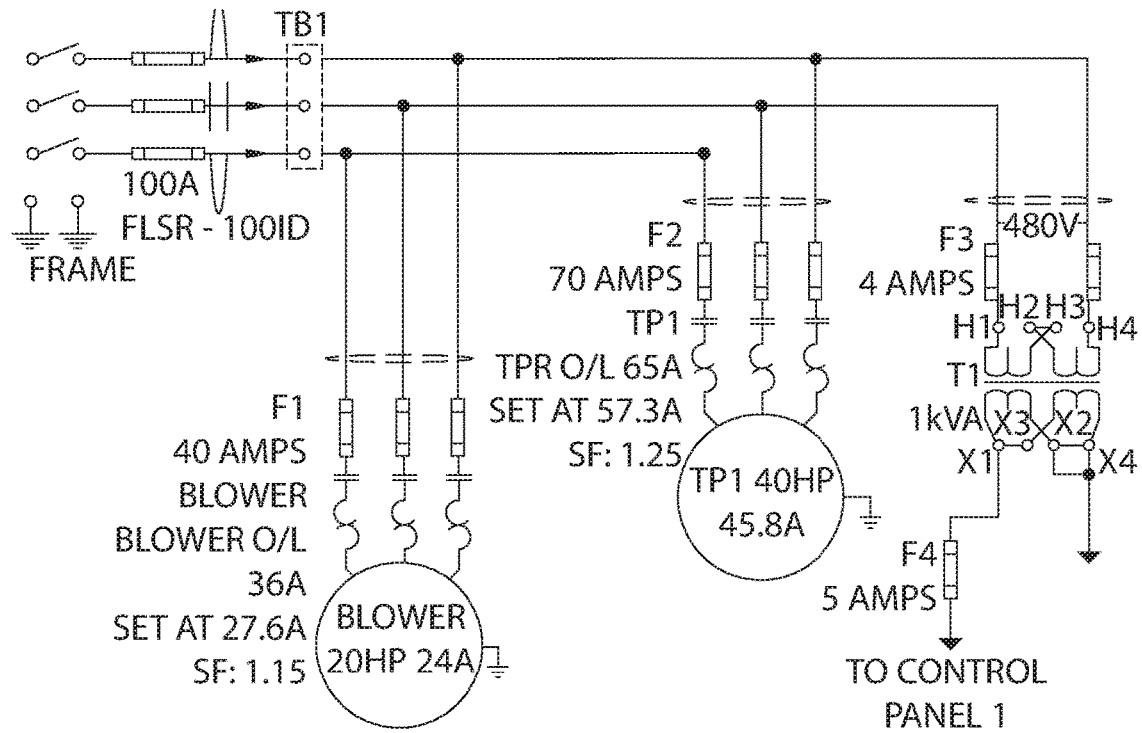
FIG. 8A is a schematic view of a first control panel and an electrical schematic of the power distribution thereof in accordance with an embodiment of the present invention.
Figure 8A:
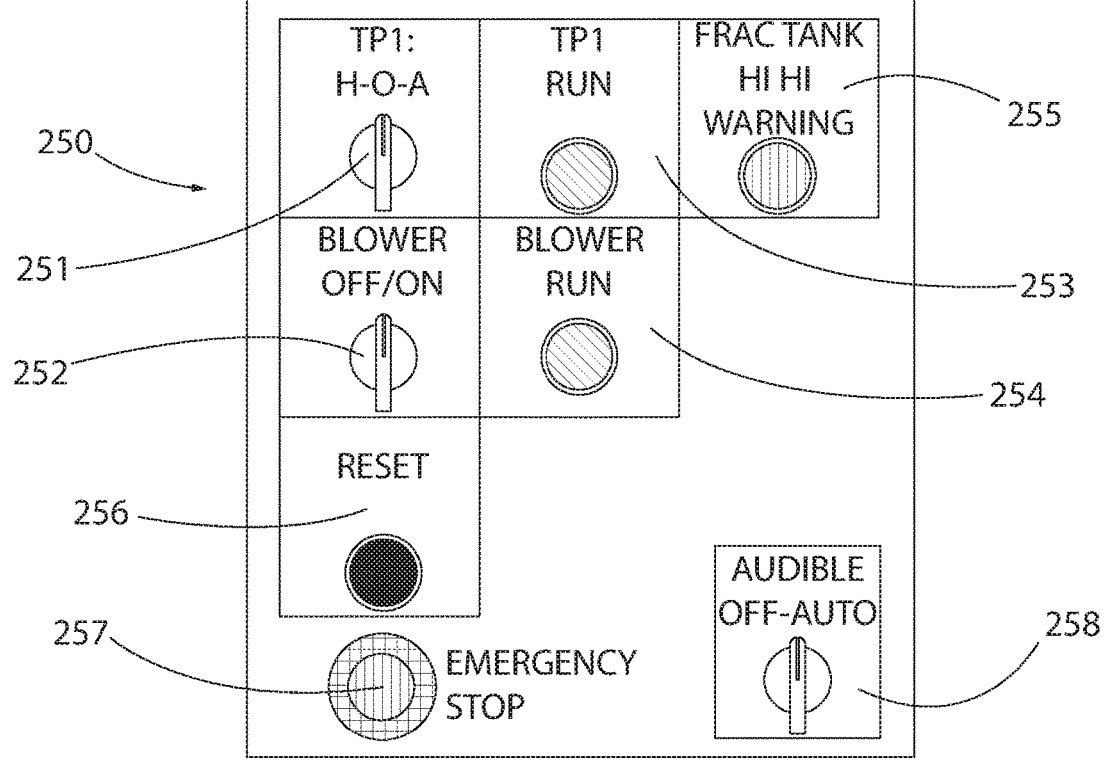

Referring to FIG. 8A, the details of the first control panel 250 will be described. The first control panel 250 has various buttons, levers, switches or the like that enable a system operator to provide instructions to the system through the first control panel 250 to control operation of the system. The first control panel 250 has a TP1 switch 251 that enables an operator to switch operation of the pump 506 between hand mode, off mode and auto mode. The first control panel 250 has a blower switch 252 that enables an operator to switch operation of the blower 601 between an on mode and an off mode. Although the switches 251, 252 are illustrated as dials or toggle switches, the invention is not to be so limited and the switches 251, 252 can be activated or altered in any manner.

The first control panel 250 also has various lights that illuminate as necessary to warn the operator of certain fault conditions and to aid in troubleshooting. Specifically, the first light 253 indicates the status of the pump 506. When the first light 253 is illuminated in green (or any other color), it indicates that the pump 506 is operating. The second light 254 indicates the status of the blower 601. When the second light 254 is illuminated in green (or any other color), it indicates that the blower 601 is operating. The third light 255 is associated with the high float and is an alarm or warning light. When the third light 255 is illuminated in red (or any other color), it indicates that the liquid level in the holding tank 200 is high. The system will respond to this illumination by closing the valve 503 to reduce the influx of wastewater into the holding tank 200 and/or by increasing the speed of the pump 506 if possible. The first control panel 250 also includes a reset button 256. Pushing the reset button 256 resets any system fault and allows a system restart. The first control panel 250 further includes an emergency stop button 257. Pushing the emergency stop button 257 causes the entire system to shut down and halt operations. Finally, the first control panel 250 has an audible switch 258 that can be altered between an off and an auto state.

Figure 8B:
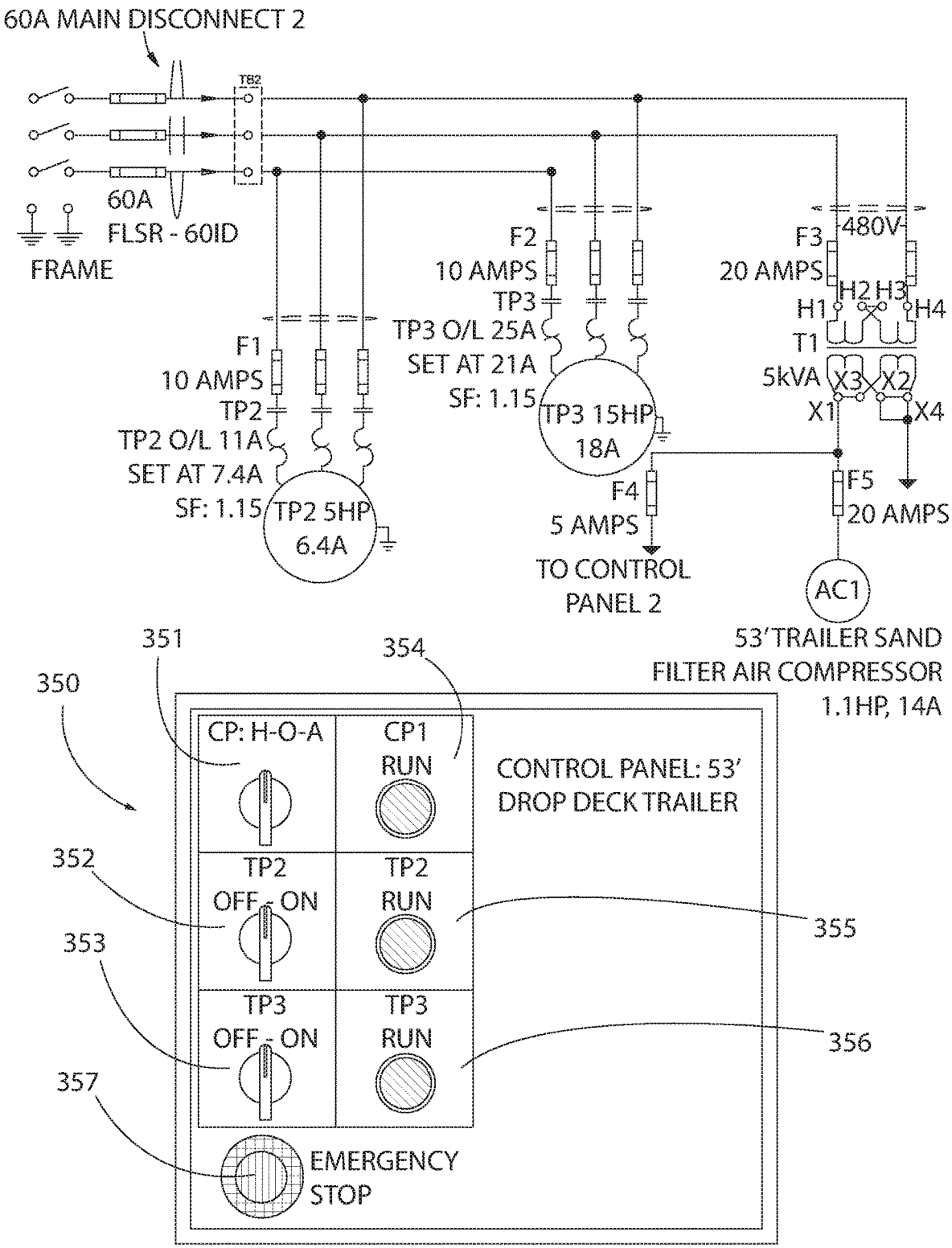
FIG. 8B is a schematic view of a second control panel and an electrical schematic of the power distribution thereof in accordance with an embodiment of the present invention.

Referring now to FIG. 8B, the details of the second control panel 350 will be described. The second control panel 350 has a CP switch 351 that is alterable between a hand, off and auto position. The CP switch 351 controls operation of the flow control mechanism 381. The second control panel 350 also has a TP2 switch 352 and a TP3 switch 353, each of which is alterable between an off mode and an on mode. The TP2 switch 352 controls operation of the pump 530 and the TP3 switch controls operation of the pump 524.

The second control panel 350 also has various lights. The first light 354 illuminates in green (or any other color) when the flow control mechanism 381 is operating. The second light 355 illuminates in green (or any other color) when the pump 530 is operating. The third light 356 illuminates in green (or any other color) when the pump 524 is operating. The second control panel 350 also has an emergency stop button 357. Pushing the emergency stop button 357 causes the entire system to shut down and halt operations.

Figure 9A:
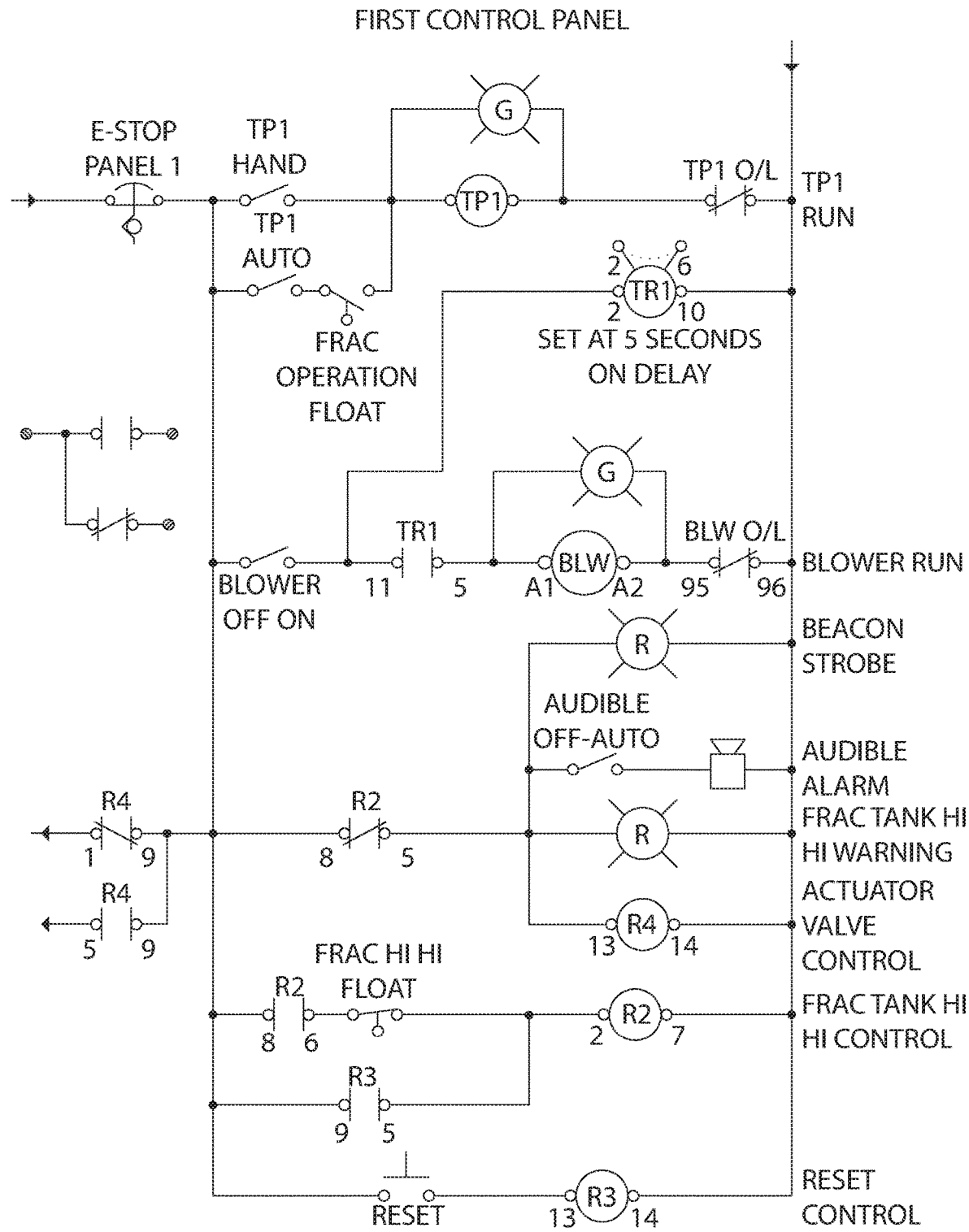
FIG. 9A is an electrical schematic of the relay logic controls of the first control panel of FIG. 8A.
Figure 9B:
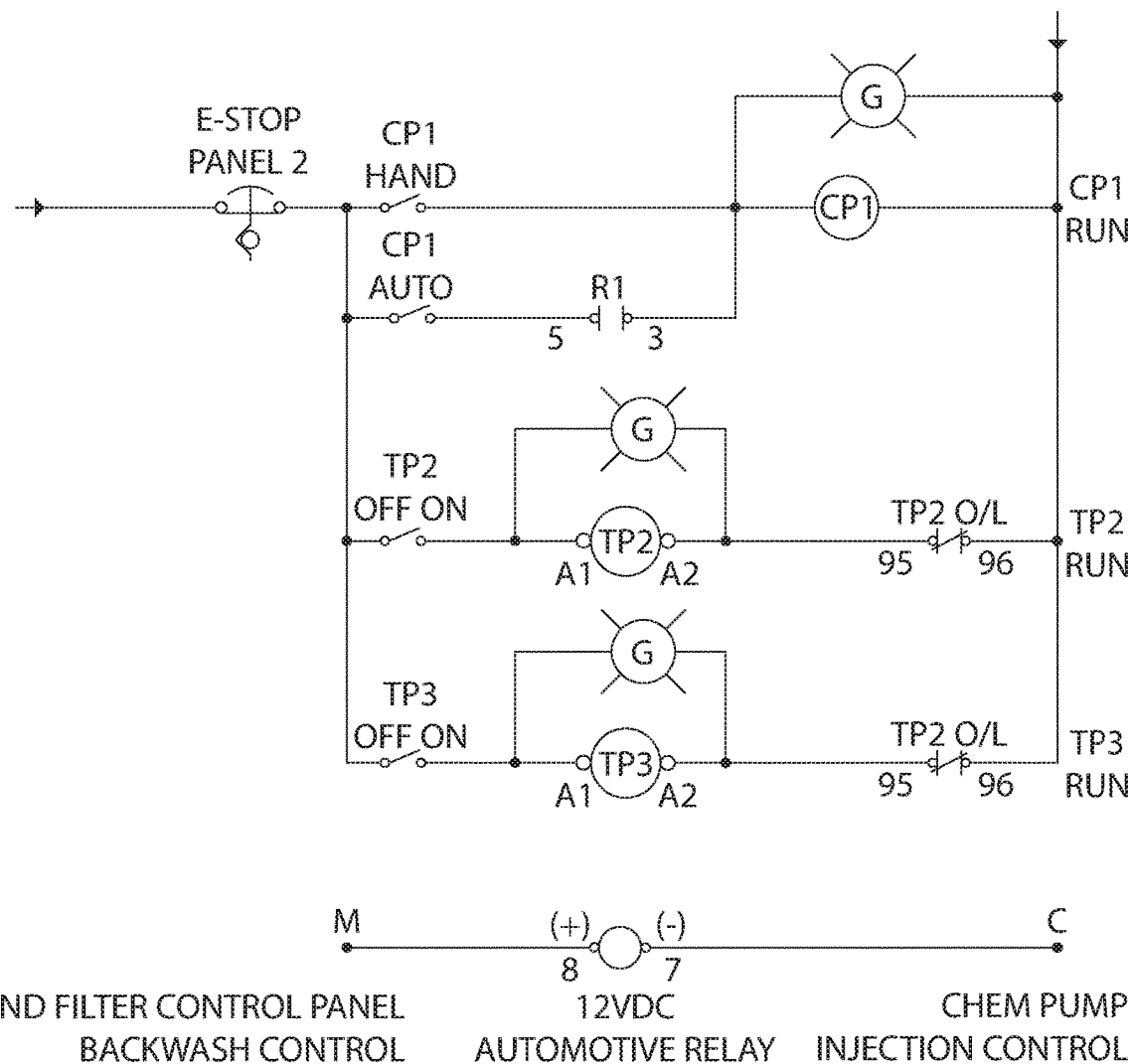
FIG. 9B is an electrical schematic of the relay logic controls of the second control panel of FIG. 8B.

FIGS. 9A and 9B are electrical schematics of the relay logic controls of the first and second control panels.

In certain embodiments, more than one of the systems 100 described herein can be used at a single wastewater treatment site. Specifically, two or more of the three-trailer systems can be used in order to increase the flow rate at which the wastewater is being treated. In certain embodiments, each three trailer system 100 is capable of treating the wastewater to desired discharge limitations at 500 gallons per minute. Using multiple three trailer systems 100 can increase that flow rate as needed.

Furthermore, as noted above the inventive system can be used in a plug and play manner. Specifically, in certain embodiments the holding tank 200 and the second trailer 400 may be used in a system, but it may be desired to change out the first trailer 300 for a different trailer containing different treatment components therein. This different trailer can simply be brought to the site and fluidly coupled to the holding tank 200 and to the second trailer 400 using various conduits in a desired manner. Thus, different treatment regimens can be performed by plugging different trailers into and out of the system as needed. Any of many different combinations of trailers and system components can be used to meet the needs of a particular wastewater site.

In certain of the claims of the present invention, the steps are written in a particular order. However, it should be understood that some of the steps can take place concurrently. Specifically, some of the steps occur in a continual manner such that those steps occur concurrently with the steps that precede and/or follow.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of backwashing a sand filter in a wastewater treatment system, the method comprising:
   a) flowing wastewater through at least one sand filter in a first flow direction;
   b) backwashing the at least one sand filter to form backwashed water;
   c) upon initiation of step b), automatically injecting chlorine into the at least one sand filter;
   d) flowing the backwashed water from the at least one sand filter to at least one hydrocyclone to separate the backwashed water into solid material and liquid;
   e) flowing the solid material from the at least one hydrocyclone into a slop tank for temporary storage of the solid material;
   f) flowing the liquid from the at least one hydrocyclone into a settling tank; and
   g) flowing the liquid from the settling tank and into a holding tank.

2. The method of claim 1, wherein steps b) and c) occur contemporaneously.

3. The method of claim 1, wherein step b) comprises flowing a fluid through the at least one sand filter in a second flow direction, the second flow direction being opposite the first flow direction, and wherein step c) comprises automatically injecting the chlorine into the fluid before the fluid enters the at least one sand filter to form a chlorinated fluid.

4. The method of claim 3, wherein steps b) and c) occur contemporaneously and comprise automatically flowing the chlorinated fluid through the at least one sand filter in the second flow direction.

5. The method of claim 1, further comprising:
   step a) further comprising:
   a-1) flowing the wastewater through a first sand filter in the first flow direction; and
   a-2) flowing the wastewater through a second sand filter in the first flow direction;
   step b) further comprising:
   b-1) continuing to flow the wastewater through the first sand filter in the first flow direction to form sand filtered wastewater as an effluent from the first sand filter; and
   b-2) discontinuing flow of the wastewater through the second sand filter in the first flow direction; and
   step c) further comprising:
   c-1) automatically injecting the chlorine into the sand filtered wastewater to form a chlorinated wastewater; and
   c-2) flowing the chlorinated wastewater through the second sand filter in a second flow direction to backwash the second sand filter, the second flow direction being opposite the first flow direction.

6. The method of claim 1, further comprising, before step d), injecting a clarifying agent into the backwashed water to induce flocculation of particles suspended in the backwashed water.

7. The method of claim 1, wherein the holding tank stores a mixture of the liquid of the backwashed water and untreated wastewater that is introduced into the holding tank from a source of the untreated wastewater.

8. The method of claim 7, wherein step a) comprises flowing the mixture of the liquid and the untreated wastewater from the holding tank to the at least one sand filter.

9. The method of claim 1, wherein the at least one sand filter, the settling tank and the at least one hydrocyclone are positioned on a wastewater treatment trailer and wherein the slop tank is positioned external and adjacent to the wastewater treatment trailer.

* * * * *